(12) United States Patent
Gregorski et al.

(10) Patent No.: US 10,921,492 B2
(45) Date of Patent: Feb. 16, 2021

(54) COATED ARTICLES WITH LIGHT-ALTERING FEATURES AND METHODS FOR THE PRODUCTION THEREOF

(71) Applicant: Corning Incorporated, Corning, NY (US)

(72) Inventors: Joan Deanna Gregorski, Painted Post, NY (US); Shandon Dee Hart, Elmira, NY (US); Karl William Koch, III, Elmira, NY (US); Carlo Anthony Kosik Williams, Painted Post, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 55 days.

(21) Appl. No.: 16/243,568

(22) Filed: Jan. 9, 2019

(65) Prior Publication Data

US 2019/0219739 A1 Jul. 18, 2019

Related U.S. Application Data

(60) Provisional application No. 62/615,226, filed on Jan. 9, 2018.

(51) Int. Cl.
*G02B 1/14* (2015.01)
*C03C 17/34* (2006.01)
(Continued)

(52) U.S. Cl.
CPC .............. *G02B 1/14* (2015.01); *C03C 15/00* (2013.01); *C03C 17/3435* (2013.01);
(Continued)

(58) Field of Classification Search
CPC ...... G02B 1/14; G02B 5/0294; G02B 5/0236; G02B 1/11; C03C 17/3452;
(Continued)

(56) References Cited

U.S. PATENT DOCUMENTS 3,067,021 A 12/1962 Pelley et al.
3,150,032 A 9/1964 Rubenstein
(Continued)

FOREIGN PATENT DOCUMENTS

AU 199540318 A 8/1996
AU 2015252116 A1 11/2015
(Continued)

OTHER PUBLICATIONS

Boerner et al; "Holographic Antiglare and Antireflection Films for Flat Panel Displays" SID 03 Digest, 7.3, p. 68, 2003.
(Continued)

*Primary Examiner* — Nathan L Van Sell

(57) ABSTRACT

According to one or more embodiments described herein, a coated article may comprise: a transparent substrate having a major surface, the major surface comprising a textured or rough surface inducing light scattering; and an optical coating disposed on the major surface of the transparent substrate and forming an air-side surface, the optical coating comprising one or more layers of material, the optical coating having a physical thickness of greater than 300 nm, wherein the coated article exhibits a maximum hardness of about 10 GPa or greater as measured on the air-side surface by a Berkovich Indenter Hardness Test along an indentation depth of about 50 nm or greater.

26 Claims, 20 Drawing Sheets

(51) Int. Cl.
*G02B 5/02* (2006.01)
*C03C 15/00* (2006.01)
*B24C 1/06* (2006.01)
*G02B 1/11* (2015.01)

(52) U.S. Cl.
CPC ........ *C03C 17/3452* (2013.01); *G02B 5/0236* (2013.01); *G02B 5/0294* (2013.01); *B24C 1/06* (2013.01); *C03C 2204/08* (2013.01); *C03C 2217/734* (2013.01); *C03C 2217/78* (2013.01); *G02B 1/11* (2013.01)

(58) Field of Classification Search
CPC ................ C03C 17/3435; C03C 15/00; C03C 2217/734; C03C 2204/08; C03C 2217/78; B24C 1/06
See application file for complete search history.

(56) References Cited

U.S. PATENT DOCUMENTS

| | | |
|---|---|---|
| 3,413,058 A | 11/1968 | Tung et al. |
| 4,687,707 A | 8/1987 | Matsuo et al. |
| 4,797,316 A | 1/1989 | Hecq et al. |
| 4,946,923 A | 8/1990 | Nagata et al. |
| 5,470,606 A | 11/1995 | De Boer |
| 5,618,619 A | 4/1997 | Petrmichl et al. |
| 5,737,472 A | 4/1998 | Bernasson et al. |
| 6,046,855 A | 4/2000 | Goto |
| 6,208,389 B1 | 3/2001 | Aben et al. |
| 6,219,121 B1 | 4/2001 | Sahouani et al. |
| RE37,183 E | 5/2001 | Kawamura et al. |
| 6,254,913 B1 | 7/2001 | Wadsworth et al. |
| 6,286,965 B1 | 9/2001 | Caskey et al. |
| 6,340,404 B1 | 1/2002 | Oka et al. |
| 6,521,677 B2 | 2/2003 | Yashiro et al. |
| 6,723,423 B1 | 4/2004 | Kaneko et al. |
| 6,824,709 B2 | 11/2004 | Shundo |
| 6,846,599 B2 | 1/2005 | Ide |
| 6,862,139 B2 | 3/2005 | Chang et al. |
| 7,037,573 B2 | 5/2006 | Miyatake et al. |
| 7,122,253 B2 | 10/2006 | Yamaguchi et al. |
| 7,128,428 B2 | 10/2006 | Takahashi et al. |
| 7,149,032 B2 | 12/2006 | Ohishi et al. |
| 7,171,676 B2 | 1/2007 | Takeda et al. |
| 7,253,861 B2 | 8/2007 | Niiyama et al. |
| 7,264,866 B2 | 9/2007 | Hashimoto et al. |
| 7,332,213 B2 | 2/2008 | Mimura et al. |
| 7,371,439 B2 | 5/2008 | Matsunaga et al. |
| 7,371,786 B2 | 5/2008 | Yoshihara et al. |
| 7,390,099 B2 | 6/2008 | Takao et al. |
| 7,410,686 B2 | 8/2008 | Osada et al. |
| 7,542,207 B2 | 6/2009 | Matsunaga |
| 7,604,358 B2 | 10/2009 | Ninomiya et al. |
| 7,629,400 B2 | 12/2009 | Hyman |
| 7,645,502 B2 | 1/2010 | Mikami et al. |
| 7,737,633 B2 | 6/2010 | Zheng |
| 7,796,123 B1 | 9/2010 | Irvin, Jr. et al. |
| 7,799,732 B2 | 9/2010 | Tanaka et al. |
| 7,903,340 B2 | 3/2011 | Nagahama et al. |
| 7,973,892 B2 | 7/2011 | Lim |
| 8,026,021 B2 | 9/2011 | Stumpe et al. |
| 8,062,731 B2 | 11/2011 | Takada et al. |
| 8,110,278 B2 | 2/2012 | Hsu et al. |
| 8,124,215 B2 | 2/2012 | Takao et al. |
| 8,312,739 B2 | 11/2012 | Lee et al. |
| 8,325,418 B2 | 12/2012 | Nagahama et al. |
| 8,514,351 B2 | 8/2013 | Sasaki et al. |
| 8,561,429 B2 | 10/2013 | Allan et al. |
| 8,628,896 B2 | 1/2014 | Ikeda et al. |
| 8,845,172 B2 | 9/2014 | Jang et al. |
| 8,854,623 B2 | 10/2014 | Fontaine et al. |
| 8,888,965 B2 | 11/2014 | Kuppuswamy et al. |
| 9,023,457 B2 | 5/2015 | Carrilero et al. |
| 9,051,404 B2 | 6/2015 | Jiang et al. |
| 9,051,423 B2 | 6/2015 | Jiang et al. |
| 9,079,802 B2 | 7/2015 | Bellman et al. |
| 9,102,131 B2 | 8/2015 | Derks et al. |
| 9,158,044 B2 | 10/2015 | Akiyama et al. |
| 9,263,202 B2 | 2/2016 | Lee et al. |
| 9,316,885 B2 | 4/2016 | Lo et al. |
| 9,335,444 B2 | 5/2016 | Hart et al. |
| 9,359,261 B2 | 6/2016 | Bellman et al. |
| 9,366,784 B2 | 6/2016 | Bellman et al. |
| 9,400,420 B2 | 7/2016 | Pudleiner et al. |
| 9,411,180 B2 | 8/2016 | Gollier et al. |
| 9,418,193 B2 | 8/2016 | Dowski, Jr. et al. |
| 9,550,161 B2 | 1/2017 | Arfsten et al. |
| 9,573,842 B2 | 2/2017 | Gollier et al. |
| 9,588,263 B2 | 3/2017 | Gollier et al. |
| 9,651,720 B2 | 5/2017 | Lander et al. |
| 9,701,248 B2 | 7/2017 | Neuman et al. |
| 9,701,579 B2 | 7/2017 | Gollier et al. |
| 9,703,011 B2 | 7/2017 | Adib et al. |
| 9,718,249 B2 | 8/2017 | Kwong |
| 9,726,786 B2 | 8/2017 | Hart et al. |
| 9,766,376 B2 | 9/2017 | Ho et al. |
| 9,786,194 B2 | 10/2017 | Hyman |
| 9,823,209 B2 | 11/2017 | Yu et al. |
| 9,896,596 B2 | 2/2018 | Jung et al. |
| 9,939,557 B2 | 4/2018 | David et al. |
| 9,964,773 B2 | 5/2018 | Wang |
| 9,987,820 B2 | 6/2018 | Mehlmann et al. |
| 2002/0085284 A1 | 7/2002 | Nakamura et al. |
| 2002/0090507 A1 | 7/2002 | Barth et al. |
| 2002/0167629 A1 | 11/2002 | Blanchard |
| 2003/0234460 A1 | 12/2003 | Hayashi et al. |
| 2004/0005482 A1 | 1/2004 | Kobayashi et al. |
| 2004/0184765 A1 | 9/2004 | DiFrancesco et al. |
| 2004/0188874 A1 | 9/2004 | Hikita et al. |
| 2004/0195960 A1 | 10/2004 | Czeremuszkin et al. |
| 2004/0233174 A1 | 11/2004 | Robrecht et al. |
| 2005/0007019 A1 | 1/2005 | Kim et al. |
| 2005/0074591 A1 | 4/2005 | Zagdoun |
| 2005/0287309 A1 | 12/2005 | Veerasamy |
| 2006/0152801 A1 | 7/2006 | Matsunaga |
| 2006/0153979 A1 | 7/2006 | Asakura et al. |
| 2006/0274047 A1 | 12/2006 | Spath et al. |
| 2006/0274048 A1 | 12/2006 | Spath et al. |
| 2006/0286465 A1 | 12/2006 | Kim |
| 2007/0014981 A1 | 1/2007 | Chiang et al. |
| 2007/0141357 A1 | 6/2007 | Bekiarian et al. |
| 2007/0152985 A1 | 7/2007 | Ostergaard et al. |
| 2007/0166536 A1 | 7/2007 | Dollase et al. |
| 2007/0240804 A1 | 10/2007 | Arai et al. |
| 2007/0249789 A1 | 10/2007 | Buehler et al. |
| 2007/0266896 A1 | 11/2007 | Suwa et al. |
| 2008/0138606 A1 | 6/2008 | Yoshihara et al. |
| 2008/0191463 A1 | 8/2008 | Vermeulen et al. |
| 2009/0004462 A1 | 1/2009 | Zhang et al. |
| 2009/0017314 A1 | 1/2009 | Nadaud et al. |
| 2009/0051668 A1 | 2/2009 | Cheng |
| 2009/0135492 A1 | 5/2009 | Kusuda et al. |
| 2009/0178704 A1 | 7/2009 | Kalejs et al. |
| 2009/0268299 A1 | 10/2009 | Furui et al. |
| 2010/0062217 A1 | 3/2010 | Kurematsu |
| 2010/0130348 A1 | 5/2010 | Kang et al. |
| 2010/0149483 A1 | 6/2010 | Chiavetta, III |
| 2010/0167019 A1 | 7/2010 | Ohyanagi et al. |
| 2010/0182551 A1 | 7/2010 | Tochigi et al. |
| 2010/0195311 A1 | 8/2010 | Furui et al. |
| 2010/0196650 A1 | 8/2010 | Okawa et al. |
| 2010/0238384 A1 | 9/2010 | Tochigi et al. |
| 2010/0258752 A1 | 10/2010 | Mochizuki et al. |
| 2010/0272990 A1 | 10/2010 | Bondesan et al. |
| 2010/0316861 A1 | 12/2010 | Kubler et al. |
| 2011/0064943 A1 | 3/2011 | Wang |
| 2011/0128664 A1 | 6/2011 | Coue et al. |
| 2012/0013983 A1 | 1/2012 | Chang et al. |
| 2012/0070603 A1 | 3/2012 | Hsu |
| 2012/0113043 A1 | 5/2012 | Liu et al. |
| 2012/0250135 A1 | 10/2012 | Yeh et al. |
| 2012/0270041 A1 | 10/2012 | Matsumoto et al. |
| 2013/0127202 A1 | 5/2013 | Hart |

(56) References Cited

U.S. PATENT DOCUMENTS

| | | | |
|---|---|---|---|
| 2014/0090864 A1 | 4/2014 | Paulson | |
| 2014/0106141 A1 | 4/2014 | Bellman et al. | |
| 2014/0131091 A1 | 5/2014 | Smith | |
| 2014/0154661 A1 | 6/2014 | Bookbinder et al. | |
| 2014/0313441 A1 | 10/2014 | Lim | |
| 2014/0320422 A1 | 10/2014 | Williams et al. | |
| 2014/0376094 A1 | 12/2014 | Bellman et al. | |
| 2015/0079368 A1 | 3/2015 | Koike et al. | |
| 2015/0111725 A1 | 4/2015 | Van Buskirk et al. | |
| 2015/0160376 A1* | 6/2015 | Kohli | C03C 3/093 359/609 |
| 2015/0177778 A1 | 6/2015 | Chen et al. | |
| 2015/0185554 A1 | 7/2015 | Zhao et al. | |
| 2015/0250237 A1 | 9/2015 | Shoham et al. | |
| 2015/0253467 A1 | 9/2015 | Sano | |
| 2015/0309628 A1 | 10/2015 | Chen et al. | |
| 2015/0316442 A1 | 11/2015 | Tamada et al. | |
| 2015/0322270 A1 | 11/2015 | Amin et al. | |
| 2015/0323705 A1 | 11/2015 | Hart et al. | |
| 2015/0323812 A1 | 11/2015 | Ishak et al. | |
| 2015/0355382 A1 | 12/2015 | Henn et al. | |
| 2016/0002498 A1 | 1/2016 | Maghsoodi et al. | |
| 2016/0041308 A1 | 2/2016 | Kramer et al. | |
| 2016/0083835 A1* | 3/2016 | Adib | C03C 17/34 428/332 |
| 2016/0137873 A1 | 5/2016 | Kostromine et al. | |
| 2016/0146978 A1 | 5/2016 | Lee et al. | |
| 2016/0246154 A1 | 8/2016 | O'Keeffe | |
| 2016/0306046 A1 | 10/2016 | Axelsson et al. | |
| 2016/0362583 A1 | 12/2016 | Naik et al. | |
| 2017/0003420 A1 | 1/2017 | Berit-Debat et al. | |
| 2017/0015584 A1 | 1/2017 | Krzyzak et al. | |
| 2017/0050349 A1 | 2/2017 | Hara et al. | |
| 2017/0129806 A1 | 5/2017 | Fujii et al. | |
| 2017/0183255 A1 | 6/2017 | Walther et al. | |
| 2017/0199307 A1 | 7/2017 | Hart et al. | |
| 2017/0210666 A1 | 7/2017 | Chang et al. | |
| 2017/0260620 A1 | 9/2017 | Cheah et al. | |
| 2017/0276838 A1 | 9/2017 | Oishi et al. | |
| 2017/0307790 A1 | 10/2017 | Bellman et al. | |
| 2018/0095303 A1 | 4/2018 | Cho et al. | |
| 2018/0162091 A1 | 6/2018 | Takeda et al. | |
| 2018/0203163 A1 | 7/2018 | Thakkar et al. | |
| 2018/0251398 A1 | 9/2018 | Ikegami et al. | |
| 2018/0352668 A1 | 12/2018 | Amin et al. | |
| 2019/0039935 A1 | 2/2019 | Couillard et al. | |
| 2019/0039946 A1 | 2/2019 | Bayne et al. | |
| 2019/0045038 A1 | 2/2019 | Zhou et al. | |
| 2019/0062200 A1 | 2/2019 | He et al. | |

FOREIGN PATENT DOCUMENTS

| | | |
|---|---|---|
| CA | 2629555 A1 | 11/2009 |
| CN | 1312450 A | 9/2001 |
| CN | 1318722 A | 10/2001 |
| CN | 1653880 A | 8/2005 |
| CN | 1869736 A | 11/2006 |
| CN | 2859579 Y | 1/2007 |
| CN | 1936623 A | 3/2007 |
| CN | 1940601 A | 4/2007 |
| CN | 201165502 Y | 12/2008 |
| CN | 201483977 U | 5/2010 |
| CN | 201707457 U | 1/2011 |
| CN | 102109630 A | 6/2011 |
| CN | 201945707 U | 8/2011 |
| CN | 201984393 U | 9/2011 |
| CN | 202171708 U | 3/2012 |
| CN | 202177751 U | 3/2012 |
| CN | 202177765 U | 3/2012 |
| CN | 202182978 U | 4/2012 |
| CN | 202615053 U | 12/2012 |
| CN | 102923969 A | 2/2013 |
| CN | 103013196 A | 4/2013 |
| CN | 103013219 A | 4/2013 |
| CN | 202904161 U | 4/2013 |
| CN | 103099529 A | 5/2013 |
| CN | 202924088 U | 5/2013 |
| CN | 202924096 U | 5/2013 |
| CN | 103171230 A | 6/2013 |
| CN | 203025361 U | 6/2013 |
| CN | 103254670 A | 8/2013 |
| CN | 103302934 A | 9/2013 |
| CN | 103305816 A | 9/2013 |
| CN | 203260587 U | 10/2013 |
| CN | 203535376 U | 4/2014 |
| CN | 203567294 U | 4/2014 |
| CN | 203620645 U | 6/2014 |
| CN | 103921487 A | 7/2014 |
| CN | 103934756 A | 7/2014 |
| CN | 203689480 U | 7/2014 |
| CN | 103964705 A | 8/2014 |
| CN | 104418511 A | 3/2015 |
| CN | 104559625 A | 4/2015 |
| CN | 104845544 A | 8/2015 |
| CN | 204727835 U | 10/2015 |
| CN | 204894681 U | 12/2015 |
| CN | 105446558 A | 3/2016 |
| CN | 105737103 A | 7/2016 |
| CN | 205368144 U | 7/2016 |
| CN | 105843452 A | 8/2016 |
| CN | 105859148 A | 8/2016 |
| CN | 106113837 A | 11/2016 |
| CN | 205687804 U | 11/2016 |
| CN | 106199812 A | 12/2016 |
| CN | 205818592 U | 12/2016 |
| CN | 106338783 A | 1/2017 |
| CN | 106378880 A | 2/2017 |
| CN | 106431004 A | 2/2017 |
| CN | 106941545 A | 7/2017 |
| CN | 107042642 A | 8/2017 |
| CN | 107174867 A | 9/2017 |
| CN | 107310209 A | 11/2017 |
| EP | 698798 A2 | 2/1996 |
| EP | 1069088 A1 | 1/2001 |
| EP | 1275623 A1 | 1/2003 |
| EP | 1432874 B1 | 2/2005 |
| FR | 2966934 A3 | 5/2012 |
| GB | 2485522 A | 5/2012 |
| ID | 11085 S | 3/2011 |
| IN | 201201777 I1 | 10/2015 |
| JP | 58127463 A | 7/1983 |
| JP | 61019888 A | 1/1986 |
| JP | 2077434 A | 3/1990 |
| JP | 2156448 A | 6/1990 |
| JP | 7290652 A | 11/1995 |
| JP | 7331115 A | 12/1995 |
| JP | 2000121806 A | 4/2000 |
| JP | 2000275404 A | 10/2000 |
| JP | 2001281402 A | 10/2001 |
| JP | 2001281406 A | 10/2001 |
| JP | 2001311806 A | 11/2001 |
| JP | 2002082207 A | 3/2002 |
| JP | 2002210906 A | 7/2002 |
| JP | 2002212317 A | 7/2002 |
| JP | 2003026826 A | 1/2003 |
| JP | 2003082127 A | 3/2003 |
| JP | 2004069878 A | 3/2004 |
| JP | 2004244594 A | 9/2004 |
| JP | 2004291303 A | 10/2004 |
| JP | 2004333901 A | 11/2004 |
| JP | 2005042072 A | 2/2005 |
| JP | 2005070724 A | 3/2005 |
| JP | 2005187639 A | 7/2005 |
| JP | 2005187640 A | 7/2005 |
| JP | 2005227415 A | 8/2005 |
| JP | 2005246296 A | 9/2005 |
| JP | 2005300576 A | 10/2005 |
| JP | 2006047504 A | 2/2006 |
| JP | 2006110754 A | 4/2006 |
| JP | 2006317957 A | 11/2006 |
| JP | 2006352105 A | 12/2006 |
| JP | 2007055064 A | 3/2007 |
| JP | 2007072372 A | 3/2007 |

(56) References Cited

FOREIGN PATENT DOCUMENTS

| | | |
|---|---|---|
| JP | 2007086521 A | 4/2007 |
| JP | 2007114377 A | 5/2007 |
| JP | 2007156205 A | 6/2007 |
| JP | 2007240707 A | 9/2007 |
| JP | 2007271953 A | 10/2007 |
| JP | 2007298667 A | 11/2007 |
| JP | 2008003425 A | 1/2008 |
| JP | 2008116596 A | 5/2008 |
| JP | 2008158156 A | 7/2008 |
| JP | 2009025384 A | 2/2009 |
| JP | 2009149468 A | 7/2009 |
| JP | 2009175725 A | 8/2009 |
| JP | 2010061044 A | 3/2010 |
| JP | 2010125719 A | 6/2010 |
| JP | 2010167410 A | 8/2010 |
| JP | 2011246365 A | 12/2011 |
| JP | 2012132022 A | 7/2012 |
| JP | 2012228811 A | 11/2012 |
| JP | 2012242837 A | 12/2012 |
| JP | 2013070093 A | 4/2013 |
| JP | 2013226666 A | 11/2013 |
| JP | 2013234571 A | 11/2013 |
| JP | 05650347 B1 | 1/2015 |
| JP | 2015006650 A | 1/2015 |
| JP | 05736214 B2 | 6/2015 |
| JP | 2015167470 A | 9/2015 |
| JP | 2015171770 A | 10/2015 |
| JP | 2016009172 A | 1/2016 |
| JP | 2016201236 A | 12/2016 |
| KR | 2006024545 A | 3/2006 |
| KR | 2006060171 A | 6/2006 |
| KR | 2006065724 A | 6/2006 |
| KR | 709879 B1 | 4/2007 |
| KR | 2007054850 A | 5/2007 |
| KR | 2007063134 A | 6/2007 |
| KR | 2008048578 A | 6/2008 |
| KR | 2008057443 A | 6/2008 |
| KR | 2009098975 A | 9/2009 |
| KR | 2009119968 A | 11/2009 |
| KR | 2010013836 A | 2/2010 |
| KR | 2010123624 A | 11/2010 |
| KR | 2011047596 A | 5/2011 |
| KR | 2011078682 A | 7/2011 |
| KR | 1121207 B1 | 3/2012 |
| KR | 2014061842 A | 5/2014 |
| KR | 1517051 B1 | 5/2015 |
| KR | 2015116802 A | 10/2015 |
| KR | 2017028190 A | 3/2017 |
| KR | 2017043566 A | 4/2017 |
| WO | 0200772 A1 | 1/2002 |
| WO | 03009767 A1 | 2/2003 |
| WO | 2007049589 A1 | 5/2007 |
| WO | 2008062605 A1 | 5/2008 |
| WO | 2009008240 A1 | 1/2009 |
| WO | 2009037886 A1 | 3/2009 |
| WO | 2009065490 A2 | 5/2009 |
| WO | 2010114135 A1 | 10/2010 |
| WO | 2013023359 A1 | 2/2013 |
| WO | 2014061614 A1 | 4/2014 |
| WO | 2014117333 A1 | 8/2014 |
| WO | 2015015338 A2 | 2/2015 |
| WO | 2015030118 A1 | 3/2015 |
| WO | 2015084253 A1 | 6/2015 |
| WO | 2015115154 A1 | 8/2015 |
| WO | 2015137196 A1 | 9/2015 |
| WO | 2015190374 A1 | 12/2015 |
| WO | 2016204009 A1 | 12/2016 |
| WO | 2017041307 A1 | 3/2017 |
| WO | 2018043253 A1 | 3/2018 |
| WO | 2018125676 A1 | 7/2018 |

OTHER PUBLICATIONS

Oliver et al; "Measurement of Hardness and Elastic Modulus by Instrument Indentation: Advances In Understanding and Refinements to Methodology";. J. Mater. Res., vol. 19, No. 1, 2004, pp. 3-20.

Oliver et al; "An Improved Technique for Determining Hardness and Elastic Modulus Using Load and Displacement Sensing Indentation Experiments"; J. Mater. Res., vol. 7, No. 6, 1992, pp. 1564-1583.

Taguchi et al; "Ultra-Low-Reflective 60-IN. LCD With Uniform Moth-Eye Surface for Digital Signage," SID 10 Digest, 80.3, p. 1196, 2010.

* cited by examiner

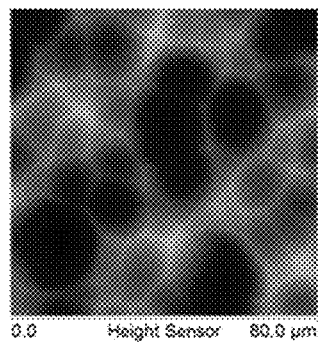 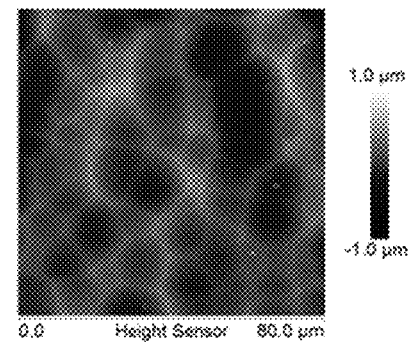
FIG. 11A  FIG. 11B
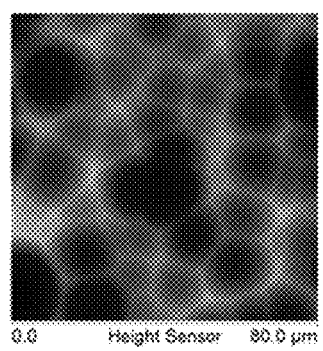 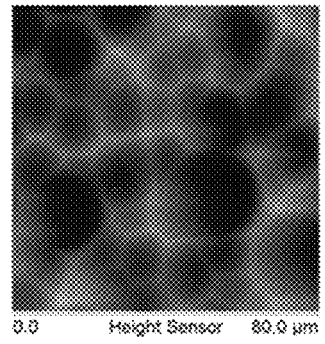
FIG. 12A  FIG. 12B

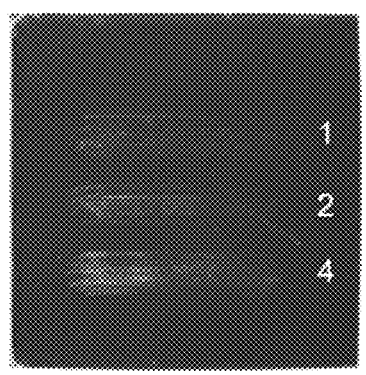 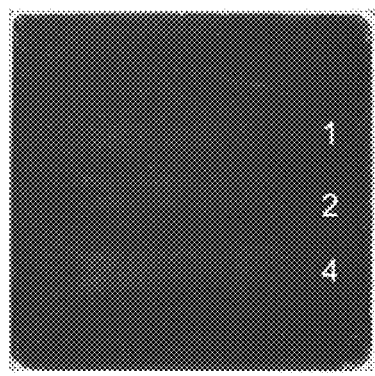
FIG. 18A          FIG. 18B
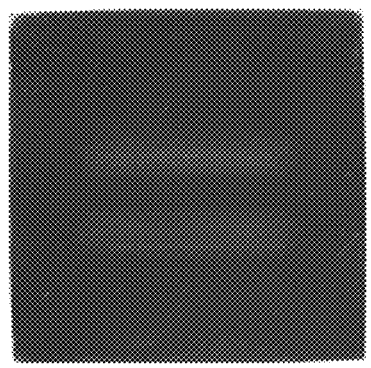 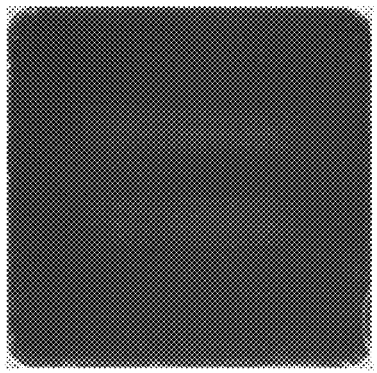
FIG. 19A          FIG. 19B

COATED ARTICLES WITH LIGHT-ALTERING FEATURES AND METHODS FOR THE PRODUCTION THEREOF

CROSS-REFERENCE TO RELATED APPLICATIONS

This application claims the benefit of priority under 35 U.S.C. § of U.S. Provisional Application Ser. No. 62/615,226 filed on Jan. 9, 2018 the contents of which are relied upon and incorporated herein by reference in their entirety as if fully set forth below.

BACKGROUND

This disclosure relates to coated articles and methods for making the same and, more particularly, to coated articles having durable and/or scratch-resistant optical coatings on transparent substrates.

Cover articles are often used to protect critical devices within electronic products, to provide a user interface for input and/or display, and/or many other functions. Such products include mobile devices, such as smart phones, mp3 players, and computer tablets. Cover articles also include architectural articles, transportation articles (e.g., articles used in automotive applications, trains, aircraft, sea craft, etc.), appliance articles, or any article that requires some transparency, scratch-resistance, abrasion resistance, or a combination thereof. These applications often demand scratch-resistance and strong optical performance characteristics, in terms of maximum light transmittance and minimum reflectance. Furthermore, some cover applications require that the color exhibited or perceived, in reflection and/or transmittance, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic requirements or other functional requirements.

The optical performance of cover articles can be improved by using various anti-reflective ("AR") coatings; however, known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials experiencing abrasion damage can also oxidize, which can further degrades the durability of the coating.

Known anti-reflective coatings are also susceptible to scratch damage and, often, are even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, such as sub-surface cracking, frictive cracking, chipping and/or wear. Evidence suggests that a majority of such scratches and other visible damage is caused by sharp contact that occurs in a single contact event. Once a significant scratch appears on the cover substrate, the appearance of the article is degraded since the scratch causes an increase in light scattering, which may cause significant reduction in brightness, clarity and contrast of images on the display. Significant scratches can also affect the accuracy and reliability of articles including touch sensitive displays. Single event scratch damage can be contrasted with abrasion damage. Single event scratch damage is not caused by multiple contact events, such as reciprocating sliding contact from hard counter face objects (e.g., sand, gravel and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

Roughened or textured surfaces having light scattering "anti-glare" function have been fabricated for use in display screens. These surfaces increase display readability under ambient lighting by diffusing or blurring reflected images, and by reducing specular reflections. Thin (<300 nm) anti-reflection coatings have been added to these kinds of textured surfaces to combine the effects of light scattering (from the textured surface) and interference-based anti-reflection (from the coatings). These types of coatings typically suffer from a low scratch resistance and a high scratch visibility.

Recently, high-hardness anti-reflective coatings having a high scratch resistance and low scratch visibility have been demonstrated. See, for example, U.S. Pat. Nos. 9,079,802, 9,359,261, 9,366,784, 9,335,444, and 9,726,786, as well as US pre-grant publications US2015/0322270 and US2017/0307790. These coatings typically include a thickness of >500 nm (and in some cases, greater than 1000, greater than 1500, or greater than 2000 nm) in order to achieve the combinations of high hardness, high scratch resistance, low reflectance, and low color shift that are beneficial for display applications.

SUMMARY

Shown herein is that relatively thick optical scratch-resistant coatings can be uniformly deposited on a textured anti-glare surface without disrupting either the light scattering from the surface texture, or the controlled color anti-reflective effects from the optical coating. Further, advantageous properties are attained. In particular, the ability to hide scratches and suppress ambient reflections is maximized by the combination of a light scattering surface with a low reflectance optical coating.

Described herein is a combination of a textured light-scattering chemically strengthened glass surface with a uniform, color-controlled, low-reflectance optical hardcoating. The high hardness minimizes the formation of scratches. The low reflectance and light scattering work together to increase display readability, reduce glare, or minimize eyestrain. The light scattering surface (light-altering features) also provides a secondary scratch hiding mechanism, as the light scattering background helps to hide scattered light that comes from certain common surface scratches and related types of damage. The light scattering and low reflectance features combine to minimize glare and maximize display readability, apparent color gamut, and/or apparent brightness, particularly in outdoor environments.

Additional features and advantages will be set forth in the detailed description which follows, and in part will be readily apparent to those skilled in the art from that description or recognized by practicing the embodiments as described herein, including the detailed description which follows, the claims, as well as the appended drawings. For example, the various features may be combined according to the following embodiments.

Embodiment 1. A coated article comprising:
a transparent substrate having a major surface, the major surface comprising a textured or rough surface inducing light scattering;
an optical coating disposed on the major surface of the transparent substrate and forming an air-side surface, the optical coating comprising one or more layers of material, the optical coating having a physical thickness of greater than 300 nm;
wherein the coated article exhibits a maximum hardness of about 10 GPa or greater as measured on the air-side surface by a Berkovich Indenter Hardness Test along an indentation depth of about 50 nm or greater.

Embodiment 2. The coated article of Embodiment 1, wherein the major surface comprises a roughness of at least one of: Rq of 100 nm or greater; and (ii) Ra of 100 nm or greater.

Embodiment 3. The coated article of Embodiment 2, wherein the optical coating has a physical thickness that is greater than the Ra or Rq of the textured surface Embodiment 4. The coated article of any of the preceding Embodiments, wherein the optical coating has a physical thickness of greater than 600 nm.

Embodiment 5. The coated article of any of the preceding Embodiments, further comprising a 2-sided specular reflectance (SCI-SCE) of at least one of: less than 4.5%; or less than 4%.

Embodiment 6. The coated article of any of the preceding Embodiments, further comprising a 1-sided specular reflectance of at least one of: less than about 0.5%; or less than about 0.25%; or less than 0.2%; or less than 0.15%; or less than 0.1%; or less as photopic averages.

Embodiment 7. The coated article of any of the preceding Embodiments, further comprising a 1-sided specular reflectance of at least one of: less than about 0.5%, from near-normal incidence angles up to 40 degrees angle of incidence; and below 3%, or below 1.5%, or below 1%, at 60 degrees angle of incidence.

Embodiment 8. The coated article of any of the preceding Embodiments, further comprising a 2-sided diffuse reflectance (SCE) of greater than about 0.05 or greater than 0.1, and less than or equal to about 0.5, or about 1, or about 1.5, or about 2.0, or about 3.0.

Embodiment 9. The coated article of any of the preceding Embodiments, further comprising a 2-sided total reflectance (SCI) less than about 5.5.

Embodiment 10. The coated article of any of the preceding Embodiments, further comprising an a* and b* reflected color values having an absolute value less than 16, less than 12, less than 10, less than 5, or even less than 2.

Embodiment 11. The coated article of any of the preceding Embodiments, further comprising:
an a* and/or b* having absolute value of at least one of: greater than about 6; from about 10 to about 16; greater than about 16; from about 10 to about 20; about 10 to about 30; about 10 to about 40; and about 10 to about 50; and
a transmitted haze value on the major surface of at least one of: about 4% to about 7%; and less than 10%.

Embodiment 12. The coated article of any of the preceding Embodiments, further comprising:
an a* and/or b* having absolute value of at least one of: less than 6; less than 5; less than 4; and less than 2; and
a transmitted haze value of the major surface of at least one of: greater than 10%; greater than 20%; greater than 25%; greater than 27%; greater than 40%; greater than 50%; and greater than 60%).

Embodiment 13. The coated article of any of the preceding Embodiments, further comprising a 20 degree DOI of at least one of: less than 95; less than 90; less than 80; or less than 70.

Embodiment 14. The coated article of any of the preceding Embodiments, further comprising a 60-degree Gloss value less than 80, or less than 60.

Embodiment 15. The coated article of any of the preceding Embodiments, further comprising a total (2-sided, visible specular plus diffuse) light transmittance of at least one of: higher than 80%, higher than 90%, higher than 94%.

Embodiment 16. The coated article of any of the preceding Embodiments, further comprising a sparkle performance (associated with a display having 140 pixels per inch) as measured by PPD of at least one of: less than 10%; or less than 5%.

Embodiment 17. The coated article of any of the preceding Embodiments, wherein after a 150 grit Garnet Scratch Test under 4 kg load (total load including weight of the spline, shaft, collet and the weight holder) for one cycle at a rate of 25 cycles/minute, the article comprises at least one of:
a 2-sided specular reflectance (SCI-SCE) of: less than 6.0% or less than 5.0%; and/or having changed from the unabraded value by less than 2%, less than 1%, or less than 0.5%;
a 2-sided diffuse reflectance (SCE) of: less than 3%, less than 2%, less than 1%, or less than 0.5%; and/or having changed from the unabraded value by less than 1%, less than 0.5%, or less than 0.2%; and
a 2-sided total reflectance (SCI) less than 6.0% or less than 5.0%, having changed from the unabraded value by less than 2%, less than 1%, less than 0.5%, or less than 0.2%.

Embodiment 18. The coated article of any of the preceding Embodiments, wherein after a Taber Abrasion Test with 400 grit Kovax abrasive paper, under a load of 1 kg total weight, for 50 cycles at a rate of 25 cycles/minute, the article comprises at least one of:
a 2-sided specular reflectance (SCI-SCE) of: less than 7.5%, less than 6.0%, or less than 5.0%; and/or having changed from the unabraded value by less than 3%, less than 2%, or less than 1%;
a 2-sided diffuse reflectance (SCE) of: less than 5%, less than 3%, less than 2%, or less than 1%; and/or having changed from the unabraded value by less than 3%, less than 2%, less than 1%, or less than 0.5%; and/or
a 2-sided total reflectance (SCI) of: less than 8.0%; and/or having changed from the unabraded value by less than 3%, less than 2%, less than 1%, or less than 0.5%.

Embodiment 19. The coated article of any of the preceding Embodiments, further comprising a hardness of at least one of: 12 GPa or greater; 14 GPa or greater; 16 GPa or greater.

Embodiment 20. The coated article of any of the preceding Embodiments, further comprising a hardness of at least 12 GPa or greater and an optical coating thickness of greater than 300 nm.

Embodiment 21. The coated article of any of the preceding Embodiments, further comprising a hardness of at least 14 GPa or greater and an optical coating thickness of at least 500 nm.

Embodiment 22. The coated article of Embodiment 1, wherein the article transmittance and/or reflectance color coordinates in the L*a*b* colorimetry system at normal incidence under an International Commission on Illumination illuminant exhibits a reference point color shift of less than about 10 from a reference point as measured at the air-side surface, the reference point comprising the color coordinates ($a^*=0$, $b^*=0$), ($a^*=-2$, $b^*=-2$), or the respective transmittance or reflectance color coordinates of the substrate, wherein:

when the reference point is the color coordinates ($a^*=0$, $b^*=0$), the color shift is defined by $\sqrt{((a^*_{article})^2+(b^*_{article})^2)}$;

when the reference point is the color coordinates ($a^*=-2$, $b^*=-2$), the color shift is defined by $\sqrt{((a^*_{article}+2)^2+(b^*_{article}+2)^2)}$; and when the reference point is the color coordinates of the substrate, the color shift is defined by $\sqrt{((a^*_{article}-a^*_{substrate})^2+(b^*_{article}-b^*_{substrate})^2)}$.

Embodiment 23. The coated article of Embodiment 1, wherein the coated article has a transmitted haze value of about 50% or less.

Embodiment 24. The coated article of any of the preceding Embodiments, wherein the substrate comprises an amorphous substrate or a crystalline substrate.

Embodiment 25. The coated article of any of the preceding Embodiments, wherein the coated article has an average photopic transmittance of about 50% or greater.

Embodiment 26. An electronic device comprising the coated article of any of the preceding claims.

BRIEF DESCRIPTION OF THE DRAWINGS

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments, wherein:

FIGS. 11A and 11B are atomic force micrographs of a substrate surface having light-altering features thereon;

FIGS. 12A and 12B are atomic force micrographs of the substrate surfaces in FIGS. 11A and 11B, respectively, having an optical coating disposed thereon, according to one or more embodiments described herein;

FIGS. 18A and 18B are images of a Garnet Scratch Test for, respectively, a glass substrate, and a glass substrate having both light-altering features and an optical coating disposed thereon according to one or more embodiments described herein;

FIGS. 19A and 19B are images of a Taber Abrasion Test for, respectively, a glass substrate, and a glass substrate having both light-altering features and an optical coating disposed thereon according to one or more embodiments described herein;

DETAILED DESCRIPTION

Figure 1:
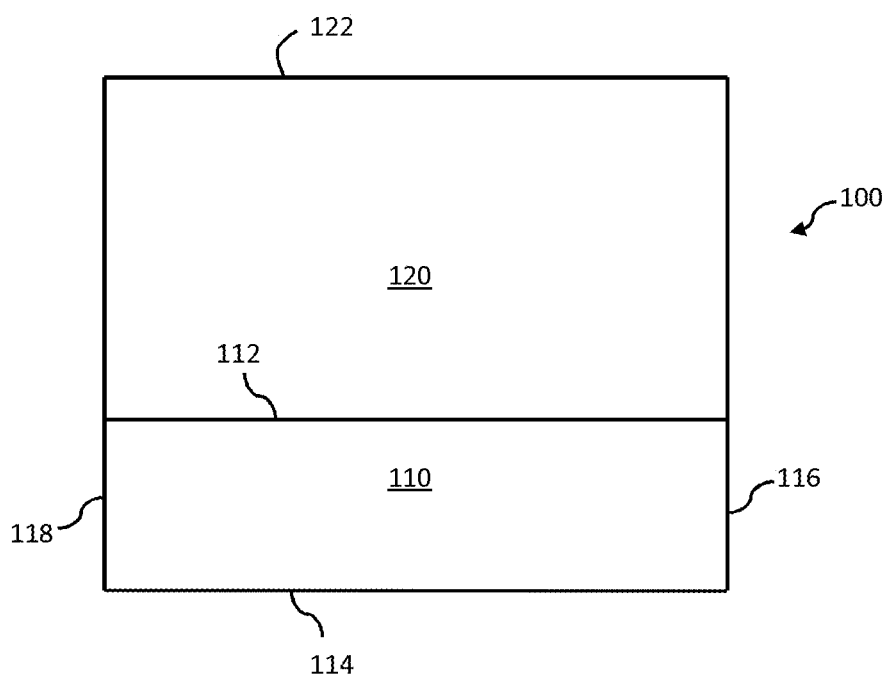
FIG. 1 is a cross-sectional side view of a coated article, according to one or more embodiments described herein.

Reference will now be made in detail to various embodiments, examples of which are illustrated in the accompanying drawings. Described herein are embodiments of coated articles which include optical coatings (which may comprise one or more discrete layers) disposed on substrates. The optical coatings include one or more light-altering features. The light-altering features incorporated into the optical coatings may reduce reflectance oscillations, reduce visible color, and/or reduce angular color shift, as described herein. Light-altering features which may be included in the optical coatings described herein may include light-scattering structural elements such as, without limitation, roughness at a layer interface or the inclusion of light-scattering members in or at an edge of a layer of an optical coating. Rough interfaces of layers and light-scattering members may scatter light in the optical coating such that optical inference from reflections throughout the coated article are non-coherent, causing reduced oscillations in the reflectance and/or transmittance spectrum of the coated article. Alternatively, or in addition to the above, the light-altering features may be present on or in the substrate on which the optical coating is disposed, and/or at the interface between the substrate and the optical coating.

Generally, some reflectance may be present at the interface between any two layers in a coated article which do not have the same refractive index. In embodiments of coated articles, this may include the interface between an optical coating with air, the interface between an optical coating with the substrate it is deposited upon, and the interfaces between any two layers of an optical coating. The reflectance from each interface contributes to the total reflectance spectrum of the coated article. In some embodiments of coated articles, the reflected, transmitted, or incident light waves interacting with two or more interfaces of a coated article may be coherent by having a fixed or well-defined relationship in frequency, phase, polarization, space, time, or a combination of these parameters, and this fixed or well-defined relationship is maintained over an extent of space and time that is large enough to be noticed by an observer. For example, the reflectance spectrum produced by two different interfaces may have a similar wavelength, and each reflectance spectrum may constructively contribute to the total reflectance spectrum of the coated article. The interfaces producing the coherent interference may be from a single layer in an optical coating, or from two or more interfaces of a coated article which do not share a common layer.

There is a need in the field for low-reflectance, controlled color, light-scattering hardcoated glass articles that can maximize display readability and provide low-reflectance, low-glare, highly scratch-resistant components that can also have transparency to visible, IR, or microwave/RF electromagnetic radiation. The combination of a light scattering surface with a low-reflectance coating maximizes the readability of a display in brightly lit ambient environments, both by reducing the absolute intensity of specular reflections that reach the user, as well as reducing the apparent sharpness (distinctness) of reflected images from the display surface.

The light scattering surface (having light-altering features) may be formed by, for example, sandblasting and etching of a glass surface followed by chemical strengthening of said glass surface (such as a Gorilla® glass substrate). High hardness may be imparted after texture formation, for example through thin film coating (such as evaporative, sputtering, or CVD coating) of the textured glass surface using a high-hardness multilayer optical interference film designed to have low reflectance and low color.

The combination of a light scattering surface (having light-altering features) with a conformal optical hardcoating reduces scratch visibility by one or more of the following mechanisms:

(i) Scratches do not form due to the high hardness of the surface;

(ii) Frictive contact with the surface by abrasive particles such as sand is reduced by the roughness of the surface. For example, the light-altering features may reduce the contact area between the article surface and the abradant thereby reducing the area of the article surface subject to possible abrasion and/or reducing the coefficient of friction between the article surface and the abradant which allows the abradant to leave the article surface more easily. Reduced friction may be further accomplished by addition of an organic 'monolayer'-type coating on the top surface of the hardcoating, such as a silane or fluorosilane 'easy-to-clean' layer; and/or (iii) Scratches that do form are less visible ('hidden') to the user because the textured surface creates light scattering that appears similar to the light scattering created by certain types of scratches.

Accordingly, there has been created surface-textured, hardcoated articles which combine some or all of the structural features and property attributes as described herein, for example:

In the unabraded state:
  (a) 2-sided specular reflectance (SCI-SCE) less than 4.5% or even less than 4%;
  (b) 1-sided specular reflectance less than about 0.5%, for example below 0.25% for wavelengths from 450 nm to 550 nm, 600 nm or 650 nm, or below about 0.2% or about 0.15% or below 0.1% as a photopic average;
  (c) 1-sided specular reflectance less than about 0.5%, from near-normal incidence angles up to 40 degrees angle of incidence, and below 3%, below 1.5%, or below 1% at 60 degrees angle of incidence;
  (d) 2-sided diffuse reflectance (SCE) greater than about 0.05 or greater than 0.1, and less than or equal to about 0.5, or about 1, or about 1.5, or about 2.0, or about 3.0;
  (e) 2-sided total reflectance (SCI) less than about 5.5;
  (f) a* and b* reflected color values having an absolute value less than 16, less than 12, less than 10, less than 5, or even less than 2. Higher color values (for example a* and/or b* having absolute value of greater than 6, or 10-16, or higher) may be used together with lower haze values (for example 4-7%, or less than 10%) on the underlying substrate to enhance (or not reduce) a high color effect. Low color values (for example a* and/or b* having absolute value of less than 6, or less than 5 or less than 4 or less than 2) may be used together with higher haze values (for example greater than 10%, or greater than 20%, or greater than 25%, or greater than 27%, or greater than 40%, or greater than 50% or greater than 60%) on the underlying substrate to further promote low color. For example, higher haze on the underlying substrate can be used to mute undesired (for some applications) reflected color;
  (g) A 20 degree DOI of less than 95, or less than 90, or less than 80, or less than 70;
  (h) A 60 degree Gloss value less than 80, or less than 60;
  (i) A total (2-sided, visible specular plus diffuse) light transmittance higher than 80%, or higher than 90%, or higher than 94%; and/or
  (j) A sparkle performance (associated with a display having 140 pixels per inch) as measured by PPD of less than 10%, or less than 5%.
In the scratched/abraded state, after Garnet 4 kg (total load including weight of the spline, shaft, collet and the weight holder), 1 cycle test, at a rate of 25 cycles/minute:
  (k) 2-sided specular reflectance (SCI-SCE) less than 6.0% or less than 5.0%, having changed from the unabraded value by less than 2%, less than 1%, or less than 0.5%;
  (l) 2-sided diffuse reflectance (SCE) less than 3%, less than 2%, less than 1%, or less than 0.5%, having changed from the unabraded value by less than 1%, less than 0.5%, or less than 0.2%; and/or
  (m) 2-sided total reflectance (SCI) less than 6.0% or less than 5.0%, having changed from the unabraded value by less than 2%, less than 1%, less than 0.5%, or less than 0.2%.
In the scratched/abraded state, after Kovax 1 kg (total weight), 50 cycle test at a rate of 25 cycles/minute:
  (n) 2-sided specular reflectance (SCI-SCE) less than 7.5%, less than 6.0%, or less than 5.0%, having changed from the unabraded value by less than 3%, less than 2%, or less than 1%;
  (o) 2-sided diffuse reflectance (SCE) less than 5%, less than 3%, less than 2%, or less than 1%, having changed from the unabraded value by less than 3%, less than 2%, less than 1%, or less than 0.5%; and/or
  (p) 2-sided total reflectance (SCI) less than 8.0%, having changed from the unabraded value by less than 3%, less than 2%, less than 1%, or less than 0.5%.

That is, any one or more of (a-p) above may be used in any and all combinations with any other ones of (a-p), and/or any and all combinations of the physical properties of the article as described herein, including but not limited to: hardness of the article and/or optical coating; surface roughness; optical coating, substrate, and/or top coating, thicknesses; layer thicknesses (physical and/or optical) and/or configurations within the optical coating; materials for the substrate, light-altering features, optical coating, and/or top coating; configuration of the light-altering features; substrate composition and/or strengthened attributes; and/or haze.

Even though there is a rough light-scattering surface texture, the inventors have surprisingly found that a thick optical coating can be coated on this textured surface while maintaining the optical coherence of the optical interference layers within the optical hardcoating, thus maintaining the desired low reflectance and controlled color performance which comes from the optical interference layers within the optical coating. This result can be considered surprising because rough surfaces that scatter light also tend to reduce coherence of optical rays, which would tend to reduce the optical efficiency of the interference-based light management layers in the optical coating, e.g. disrupting their anti-reflective or color-controlled properties. This is especially surprising for an optical coating whose thickness is substantially larger than the average surface roughness of the textured surface, as in preferred embodiments of this invention, where the surface roughness is in the range of 40-500 nm RMS and the optical coating thickness is in the range of 0.6-3 microns. Without wishing to be bound by theory, we attribute this to the relatively large lateral features sizes of the textured surface, which tend to be larger than the coating thickness, as well as relatively limited diffractive effects from the random texture.

In some embodiments, undesirable constructive interference may be particularly caused by coherent reflected waves from the interfaces at the air-side and substrate-side of a single layer of an optical coating referred to herein as a "scratch-resistant" layer. In embodiments described herein, one or more scratch-resistant layers may be included in an optical coating. These scratch-resistant layers may be relatively thick (such as greater than about 300 nm, and up to 10 micron) and hard (such as having a Berkovich hardness of greater than 10 GPa). These scratch-resistant layers may impart desirable physical characteristics upon the coated article such as increased hardness and resistance to abrasive wear. However, they may produce coherent reflected waves at their air-side and substrate-side interfaces with other layers, causing increased reflective oscillations due to interference. In one or more embodiments, light-altering features may be provided in an optical coating in or at the edge of a scratch-resistant layer. Alternatively, or in addition to the above, the light-altering features may be present on or in the substrate on which the optical coating is disposed, and/or at the interface between the substrate and the optical coating.

Referring to FIG. 1, a coated article 100 according to one or more embodiments may include a substrate 110, and an optical coating 120 disposed on the substrate 110. The substrate 110 includes opposing major surfaces 112, 114 and opposing minor surfaces 116, 118. The optical coating 120 is shown in FIG. 1 as disposed on a first opposing major surface 112; however, the optical coating 120 may be disposed on the second opposing major surface 114 and/or one or both of the opposing minor surfaces 116, 118, in addition to or instead of being disposed on the first opposing major surface 112. The optical coating 120 forms an air-side surface 122. One or more light-altering features may be provided in the optical coating 120, embodiments of which are described herein. Alternatively, or in addition to the above, the light-altering features may be present on or in the substrate on which the optical coating 120 is disposed, and/or at the interface between the substrate 110 and the optical coating 120.

The optical coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layer may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface, or alternatively includes embodiments where the material is formed on a surface with one or more intervening material(s) disposed between material and the surface. The intervening material(s) may constitute a layer, as defined herein.

In one or more embodiments, a single layer or multiple layers of the optical coating 120 may be deposited onto the substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated.

The optical coating 120 may have thickness of from about 100 nm to about 10 microns, For example, the optical coating may have a thickness greater than or equal to about 200 nm, 300 nm, 325 nm, 350 nm, 375 nm, 400 nm, 500 nm, 600 nm, 700 nm, 800 nm, 900 nm, 1 micron, 2 microns, 3 microns, 4 microns, 5 microns, 6 microns, 7 microns, or even 8 microns, and less than or equal to about 10 microns.

Figure 2A:
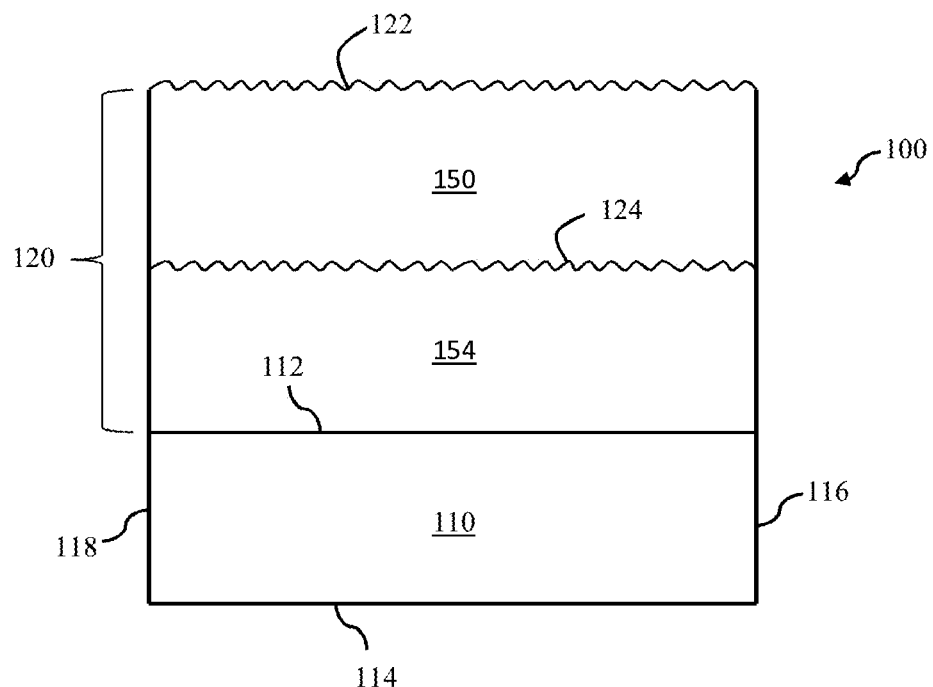
FIG. 2A is a cross-sectional side view of a coated article, according to one or more embodiments described herein.

In one or more embodiments, the optical coating 120 may include, or consist of, a scratch-resistant layer. Referring now to FIG. 2A, a coated article 100 is depicted which includes a scratch-resistant layer 150 disposed over an underlying layer 154. According to one embodiment, the scratch-resistant layer 150 may comprise one or more materials chosen from $Si_uAl_vO_xN_y$, $Ta_2O_5$, $Nb_2O_5$, AlN, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or combinations thereof. Exemplary materials used in the scratch-resistant layer 150 may include an inorganic carbide, nitride, oxide, diamond-like material, or combination thereof. Examples of suitable materials for the scratch-resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layer 150 may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. The scratch-resistant layer 150 may also comprise nanocomposite materials, or materials with a controlled microstructure, to improve hardness, toughness, or abrasion/wear resistance. For example the scratch-resistant layer 150 may comprise nanocrystallites in the size range from about 5 nm to about 30 nm. In embodiments, the scratch-resistant layer 150 may comprise transformation-toughened zirconia, partially stabilized zirconia, or zirconia-toughened alumina. In embodiments, the scratch-resistant layer 150 exhibits a fracture toughness value greater than about 1 MPa$\sqrt{m}$ and simultaneously exhibits a hardness value greater than about 10 GPa.

In one or more embodiments, the scratch-resistant layer 150 may comprise a compositional gradient. For example, a scratch-resistant layer 150 may include a compositional gradient of $Si_uAl_vO_xN_y$ where the concentration of any one or more of Si, Al, O and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 28, 2014, which is hereby incorporated by reference in its entirety.

The scratch-resistant layer 150 may be relatively thick as compared with other layers, such as greater than or equal to about 300 nm, 325 nm, 350 nm, 375 nm, 400 nm, 425 nm, 450 nm, 475 nm, 500 nm, 525 nm, 550 nm, 575 nm, 600 nm, 700 nm, 800 nm, 900 nm, 1 micron, 2 microns, 3 microns, 4 microns, 5 microns, 6 microns, 7 microns, or even 8 microns. For example a scratch-resistant layer may have a thickness from about 300 nm to about 10 microns. When the thickness of the scratch-resistant layer becomes too thin (for example below 500 nm, below 475 nm, below 450 nm, below 425 nm, below 400 nm, below 375 nm, below 350 nm, or below 325 nm), then the hardness of the article is reduced, and it becomes more prone to scratching. For example, a hardness of 14 GPa may be suitably obtained by using a scratch-resistant layer thickness of about 500 nm or greater.

In one or more embodiments, the underlying layer 154 may be comprised of a material having a refractive index similar to that of the substrate 110. For example, the underlying layer 154 may have a refractive index within about 0.1, 0.05, or even within 0.01 of the refractive index of the substrate 110. Materials of the underlying layer 154 may depend on the composition of the substrate 110, but in embodiments where the substrate is glass, $BaF_2$ may be a suitable material for the underlying layer 154. Matching the refractive index of the underlying layer 154 with the refractive index of the substrate 110 may reduce reflections originating at the substrate surface 112.

The optical coatings described herein may comprise one or more light-altering features. For example, as schematically shown in FIG. 2A, the optical coating 120 may comprise a rough interface 124 between two adjacent layers in the optical coating, such as the underlying layer 154 and the scratch-resistant layer 150. Other interfaces of coated article 100 may be rough, such as the interfaces at the substrate surface 112 (not depicted as rough in FIG. 2A, but as produced by a roughened surface of the substrate itself, or by light-altering features in the optical coating at the surface 112) and at the air-side surface 122 of the optical coating 120. In one or more embodiments, the rough interface may be characterized by its arithmetic average roughness ($R_a$) or its root mean squared roughness ($R_q$). $R_a$ and $R_q$ may be determined from the formulas:

$$R_a = \frac{1}{n}\sum_{i=1}^{n}|y_i|, R_q = \sqrt{\frac{1}{n}\sum_{i=1}^{n}y_i^2}$$

where n represents the number of measurement locations and y represents the measured height. In one or more embodiments, a rough interface may have a $R_a$ greater than or equal to 5 nm, 10 nm, 15 nm, 20 nm, 25 nm, 30 nm, 35 nm, 40 nm, 50 nm, 60 nm, 70 nm, 80 nm, 90 nm, 100 nm, 110 nm, 120 nm, 130 nm, 140 nm, 150 nm, 160 nm, 165 nm, 170 nm, 175 nm, 180 nm, 190 nm, or even 200 nm. 40 nm, 50 nm, 60 nm, 70 nm, 80 nm, 90 nm, 100 nm, 110 nm, 120 nm, 130 nm, 140 nm, 150 nm, 160 nm, 165 nm, 170 nm, 175 nm, 180 nm, 190 nm, 200 nm, 210 nm, 220 nm, 225 nm, 230 nm, 240 nm, 250 nm, 260 nm, 270 nm, or even 275 nm. In one or more embodiments, a rough interface may have a $R_q$ of greater than or equal to 5 nm, 10 nm, 15 nm, 20 nm, 25 nm, 30 nm, 35 nm, 40 nm, 50 nm, 60 nm, 70 nm, 80 nm, 90 nm, 100 nm, 110 nm, 120 nm, 130 nm, 140 nm, 150 nm, 160 nm, 165 nm, 170 nm, 175 nm, 180 nm, 190 nm, 200 nm, 210 nm, 220 nm, 225 nm, 230 nm, 240 nm, 250 nm, 260 nm, 270 nm, 275 nm, 300 nm, 350, 400 nm, 400 nm, 500 nm, or even 600 nm, and up to 1 micrometer (micron, or μm), or in some instances up to 2 microns, and any range or sub-range between the above numbers, for example 40 nm to 300 nm, 50 nm to 350 nm, or 50 nm to 400 nm, or 50 nm to 500 nm, or 50 nm to 550 nm, or 50 nm to 600 nm, or 50 nm to 650 nm, or 50 nm to 700 nm, or 50 nm to 1000 nm, or 60 nm to 350 nm, or 60 nm to 400 nm, or 60 nm to 500 nm, or 60 nm to 550 nm, or 60 nm to 600 nm, or 60 nm to 650 nm, or 60 nm to 700 nm, or 60 nm to 1000 nm, or 70 nm to 350 nm, or 70 nm to 400 nm, or 70 nm to 500 nm, or 70 nm to 550 nm, or 70 nm to 600 nm, or 70 nm to 650 nm, or 70 nm to 700 nm, or 70 nm to 1000 nm, or 90 nm to 350 nm, or 90 nm to 400 nm, or 90 nm to 500 nm, or 90 nm to 550 nm, or 90 nm to 600 nm, or 90 nm to 650 nm, or 90 nm to 700 nm, or 90 nm to 1000 nm, or 100 nm to 350 nm, or 100 nm to 400 nm, or 100 nm to 500 nm, or 100 nm to 550 nm, or 100 nm to 600 nm, or 100 nm to 650 nm, or 100 nm to 700 nm, or 100 nm to 1000 nm, or 120 nm to 350 nm, or 120 nm to 400 nm, or 120 nm to 500 nm, or 120 nm to 550 nm, or 120 nm to 600 nm, or 120 nm to 650 nm, or 120 nm to 700 nm, or 120 nm to 1000 nm, or 140 nm to 350 nm, or 140 nm to 400 nm, or 140 nm to 500 nm, or 140 nm to 550 nm, or 140 nm to 600 nm, or 140 nm to 650 nm, or 140 nm to 700 nm, or 140 nm to 1000 nm, or 160 nm to 350 nm, or 160 nm to 400 nm, or 160 nm to 500 nm, or 160 nm to 550 nm, or 160 nm to 600 nm, or 160 nm to 650 nm, or 160 nm to 700 nm, or 160 nm to 1000 nm, or 180 nm to 350 nm, or 180 nm to 400 nm, or 180 nm to 500 nm, or 180 nm to 550 nm, or 180 nm to 600 nm, or 180 nm to 650 nm, or 180 nm to 700 nm, or 180 nm to 1000 nm, or 200 to 350 nm, or 200 nm to 400 nm, or 200 nm to 500 nm, or 200 nm to 550 nm, or 200 nm to 600 nm, or 200 nm to 650 nm, or 200 nm to 700 nm, or 200 nm to 1000 nm, or 220 to 350 nm, or 220 nm to 400 nm, or 200 nm to 500 nm, or 220 nm to 550 nm, or 220 nm to 600 nm, or 220 nm to 650 nm, or 220 nm to 700 nm, or 220 nm to 1000 nm, or 240 to 350 nm, or 240 nm to 400 nm, or 240 nm to 500 nm, or 240 nm to 550 nm, or 240 nm to 600 nm, or 240 nm to 650 nm, or 240 nm to 700 nm, or 240 nm to 1000 nm, or 260 to 350 nm, or 260 nm to 400 nm, or 260 nm to 500 nm, or 260 nm to 550 nm, or 260 nm to 600 nm, or 260 nm to 650 nm, or 260 nm to 700 nm, or 260 nm to 1000 nm, or 280 to 350 nm, or 280 nm to 400 nm, or 280 nm to 500 nm, or 280 nm to 550 nm, or 280 nm to 600 nm, or 280 nm to 650 nm, or 280 nm to 700 nm, or 280 nm to 1000 nm, or 300 to 350 nm, or 300 nm to 400 nm, or 300 nm to 500 nm, or 300 nm to 550 nm, or 300 nm to 600 nm, or 300 nm to 650 nm, or 300 nm to 700 nm, or 300 nm to 1000 nm.

Roughness may be measured using any known techniques for measuring roughness, such as optical profilometry (e.g., using Zygo interferometers) and surface contact profilometry (e.g., using atomic force microscopy, AFM). The surface area of measurement is large enough to capture a statistically representative sample of the types of surface features that can be found on a sample. For example, for anti-glare surfaces having features on the order of 50 μm×50 μm in the x-y plane, a suitable measurement surface area may be at least 500 μm×500 μm. In some examples, a length of a side of a sample area may be between 10 and 30 lateral feature sizes, which depends on surface topography of the texture or roughness.

Figure 2B:
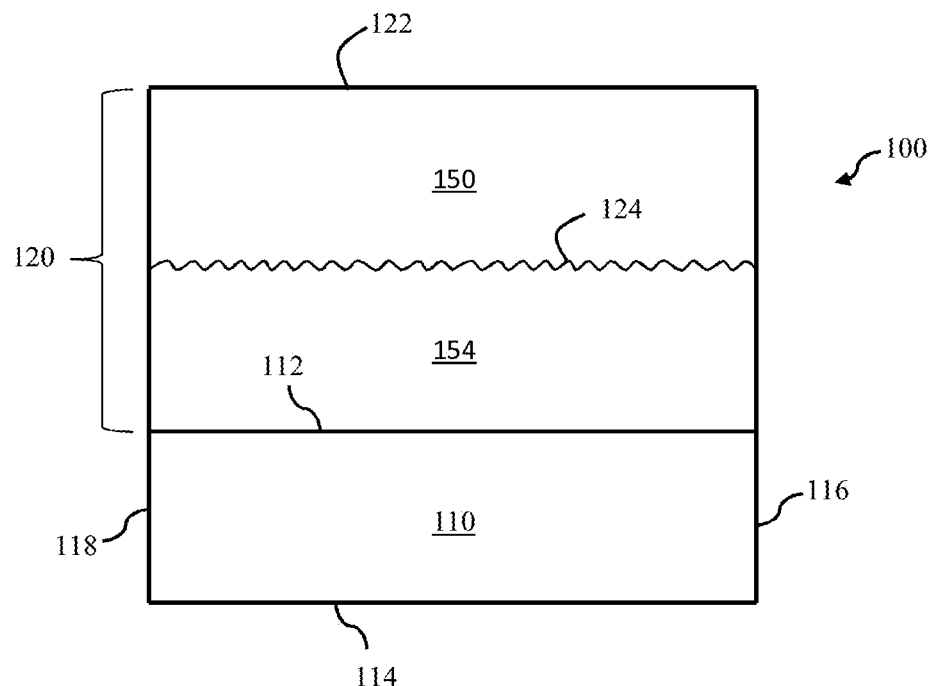
FIG. 2B is a cross-sectional side view of a coated article, according to one or more embodiments described herein.

According to embodiments, a rough interface may be produced by various methods such as, but not limiting to, growth of a crystal morphology in a layer which produces roughness, chemical processing such as chemical etching, or mechanical processing such as mechanical etching, cutting, tooling, etc. For example, in one embodiment, $BaF_2$ may be deposited as a layer of the optical coating 120, such as an underlying layer 154, having a crown type crystallite morphology. An embodiment of such a deposition of $BaF_2$ is explained in the Examples which follow. Following deposition, the top surface of the underlying layer 154 (at interface 124) may be rough, and another layer, such as the scratch-resistant layer 150, may be deposited over the underlying layer 154 at the rough interface 124. If the deposition of the scratch-resistant layer 150 is relatively consistent, then a rough surface may be present at the air-side surface 122, as shown in FIG. 2A. In another embodiment, the air-side surface 122 may be smooth. For example, the air-side surface 122 may be smoothed by polishing (chemical or mechanical) or by lamination, as depicted in the embodiment of FIG. 2B. In another embodiment, the air-side surface 122 may be smooth due to incorporating a coating process such as PECVD that is tuned to have a planarizing effect, thus leading to a smooth air-side surface 122 in the layer deposited on top of a rough buried interface.

It should be appreciated that rough or smooth layers may be deposited as any layer of an optical coating 120. For example, any interface in the coated article 100 may be made rough by, for example, the methods described herein such as growing a rough crystalline layer or growing a layer with consistent thickness over a rough interface. Rough interfaces may be made smooth by polishing or deposition techniques which promote planar surface formation.

In the embodiments depicted in FIG. 2A or 2B, if the underlying layer 154 has a similar or identical refractive index to the substrate 110, there will be little reflection at the major surface 112 of the substrate 110, and the far majority of the reflection will come from the air-side surface 122 and the rough interface 124. However, without being bound by theory, it is believed that the light scattering at the rough surface 124 causes the reflectance interference from the rough surface 124 and the air-side surface 122 to scatter.

Figure 3:
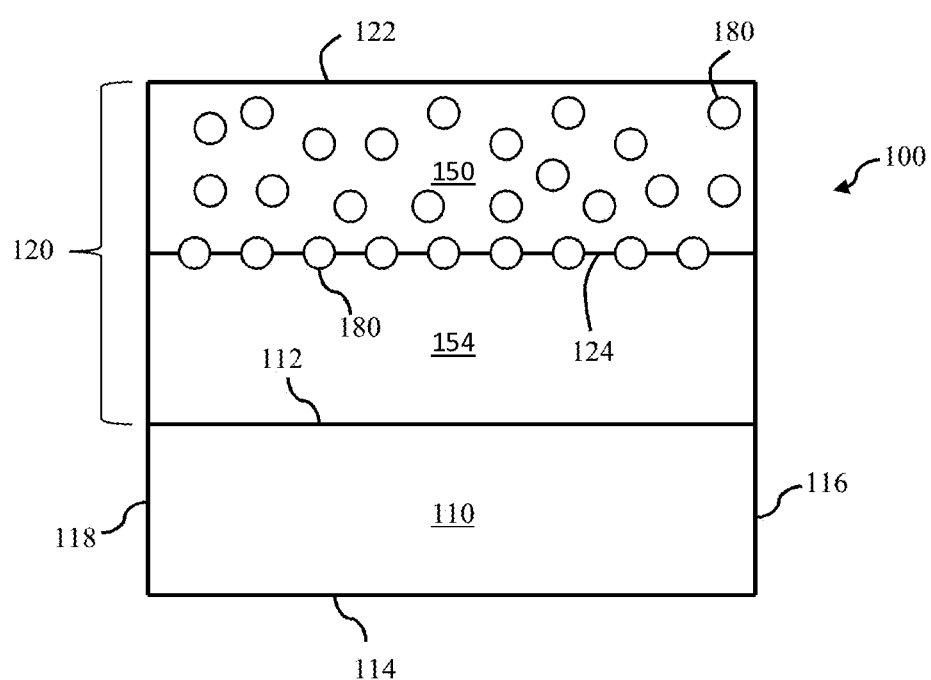
FIG. 3 is a cross-sectional side view of a coated article, according to one or more embodiments described herein.

In one or more embodiments, light-scattering members may be disposed in one or more layers or at one or more interfaces of the optical coating 120. For example, now referring to FIG. 3, light scattering members 180 may be disposed between two adjacent layers in the optical coating 120, such as the underlying layer 154 and the scratch-resistant layer 150. Also as depicted in FIG. 3, light-scattering members 180 may be disposed within a layer of the optical coating 120, such as the scratch-resistant layer 150. In some embodiments, light-scattering members 180 are disposed in the scratch-resistant layer but not at the layer interface 124, or vice versa. Alternatively, or in addition to the above, the light-scattering members 180 may be present on or in the substrate on which the optical coating is disposed, and/or at the interface between the substrate and the optical coating.

As depicted in FIG. 3, the light-scattering members 180 may be substantially spherical in shape. However, in other embodiments, the light-scattering members 180 may have other shapes or form factors, such as irregularly shaped bodies having rounded or substantially flat surfaces, including particles comprising sharp angular features. The light-scattering members 180 may have varying sizes. In one embodiment, each light-scattering member 180 may have a maximum dimension of from about 1 nm to about 1 micron (such as from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, or from about 1 nm to about 25 nm). As used herein, the "maximum dimension" refers to the greatest distance between surfaces of an individual light-scattering member 180 through the light-scattering member 180. For example, the maximum dimension of a spherical light-scattering member 180 is the diameter of the sphere. The "average maximum dimension" refers to the average of the maximum dimensions of all light-scattering members 180 of a glass article 100.

The light-scattering members 180 may comprise a composition or phase different from the other portions of the optical coating 120 adjacent to the light-scattering members 180. In embodiments, the light-scattering members 180 may comprise solids and/or gasses, or may comprise void spaces. It should further be understood that some of the light-scattering members 180 may have different compositions or phases from one another.

The light-scattering members 180 may have varying sizes and shapes, such that they affect light with different wavelengths differently. In one embodiment, light-scattering members 180 have a size distribution suitable to scatter light over the entire visible spectrum (i.e., light within the range from about 400 nm to about 700 nm). The amount of light-scattering particles may vary per surface area of the interface. However, it should be understood that the methods for producing coated articles 100 as described herein may be capable of controlling the size, shape, size distribution, and/or relative amount of the light-scattering members 180.

In additional embodiments, the light-altering features may comprise designed optical phase-modifying surfaces or interfaces such as gratings or metamaterial surfaces below, above, or within the high-index layer 150. For example, gratings may be positioned where rough interfaces are positioned in various embodiments described herein. As used herein, a "metamaterial" refers to structure comprised of a periodic arrangement of material elements in order to create desired electromagnetic properties. Electromagnetic properties arise from the periodic arrangement of atoms or molecules. Metamaterials may be produced, without limitation, by lithography or self-assembly to create a periodic arrangement of matter to produce properties which are not found in nature.

In another embodiment, the light-altering features may comprise patterned or random variations in refractive index within, above, or below the scratch-resistant layer 150. These variations may cause redirection or phase modification of reflected or transmitted light. In one or more embodiments, the variations may cause primarily forward scattering, so as to minimize external reflected haze. For example, the underlying layer 154 may not comprise a discrete particle or interface. Rather, in some embodiments, the underlying layer 154 may comprise smooth or gradual changes in refractive index, with no apparent sharp interfaces, where the underlying layer 154 can also have spatial variations in refractive index, that can have, for example, a grating-like or scattering-like effect leading to changes in phase or local angular content of the reflected or transmitted light waves. Such is described in U.S. Pat. No. 9,588,263, which is incorporated by reference herein.

It should be understood that the light-altering features described herein, such as those described with reference to FIGS. 2 and 3 in a scratch-resistant layer, may be incorporated into other embodiments of optical coatings 120. For example, additional embodiments are provided herein with reference to FIGS. 4 and 5. The light-altering features described may be incorporated into the scratch-resistant layers 150 of the embodiments of FIGS. 4 and 5. However, it should be appreciated that the light-altering features described herein may be incorporated into many embodiments of coated articles 100 and particularly into scratch-resistant layers 150 of coated articles 100. The positioning of light-altering features described should not be limited to the embodiments of coated articles 100 specifically described herein, as they may be incorporated into any layer of any coated article 100. Alternatively, or in addition to the above, the light-altering features may be present on or in the substrate on which the optical coating is disposed, and/or at the interface between the substrate and the optical coating.

The material of the light-scattering component may have a refractive index that is different from the adjacent materials of the optical coating 120. For example, the refractive index of the material of the light-scattering component 180 may be at least about 1%, at least about 2%, at least about 3%, at least about 4%, at least about 5%, at least about 10%, at least about 20%, at least about 30%, at least about 40%, or even at least about 50% different (i.e., greater than or less than) than the refractive index of the adjacent materials in the optical coating 120.

Figure 4:
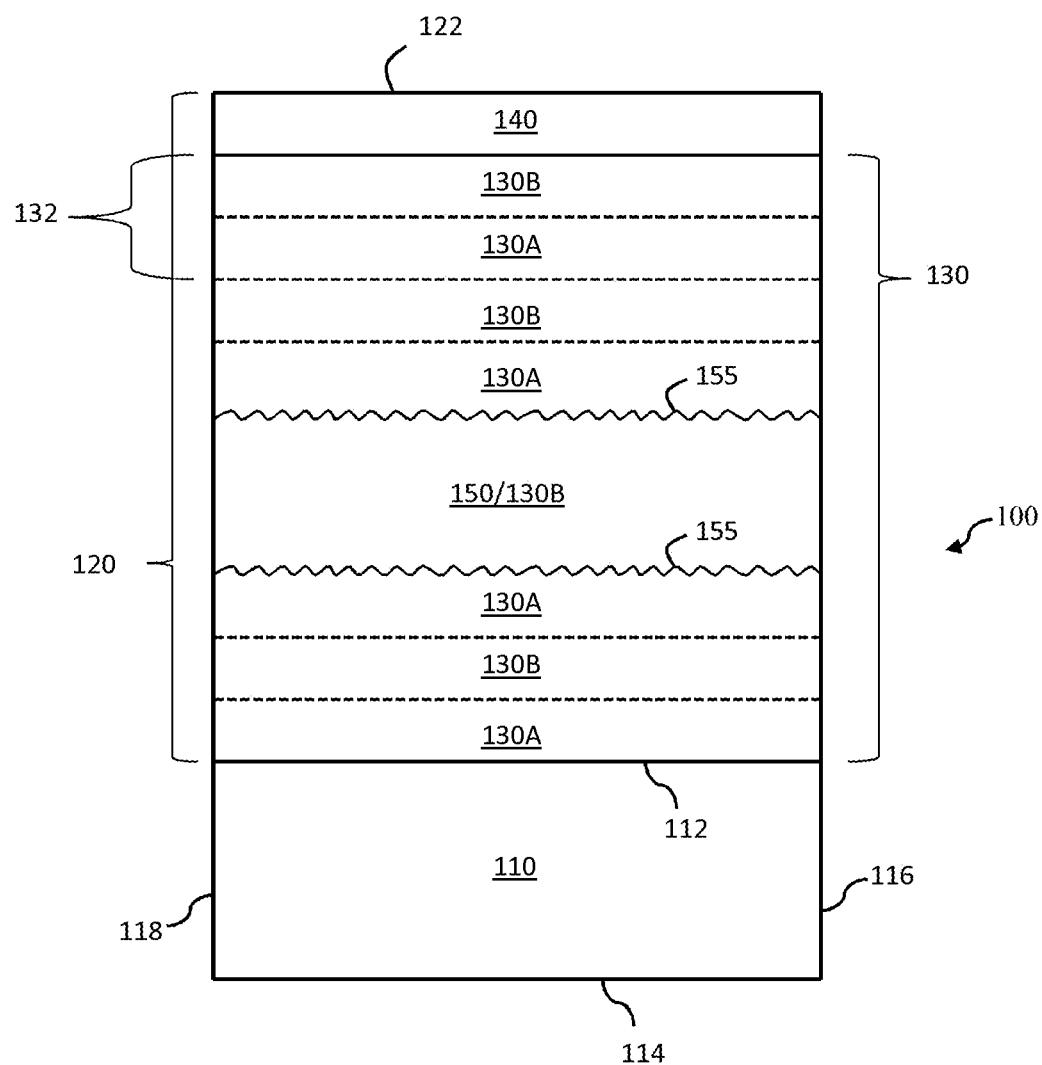
FIG. 4 is a cross-sectional side view of a coated article, according to one or more embodiments described herein.

In one or more embodiments, as shown in FIG. 4, the optical coating 120 may include an anti-reflective coating 130 which may include a plurality of layers (130A, 130B). In one or more embodiments, the anti-reflective coating 130 may include a period 132 comprising two layers, such as the low RI layer 130A and high RI layer 130B. As shown in FIG. 4, the anti-reflective coating 130 may include a plurality of periods 132. In other embodiments, a single period may include three layers such as a low RI layer, a medium RI layer, and a high RI layer. Throughout this disclosure, it should be understood that FIG. 4 is an example embodiment of an optical coating 120 having periods 132 and that that the properties (e.g., color, hardness, etc.) and materials of the optical coatings 120 described herein should not be limited to the embodiment of FIG. 4.

As used herein, the terms "low RI", "high RI" and "medium RI" refer to the relative values for the refractive index ("RI") to one another (i.e., low RI<medium RI<high RI). In one or more embodiments, the term "low RI", when used with the low RI layer, includes a range from about 1.3 to about 1.7 or 1.75. In one or more embodiments, the term "high RI", when used with the high RI layer, includes a range from about 1.7 to about 2.5 (e.g., about 1.85 or greater). In one or more embodiments, the term "medium RI", when used with a third layer of a period, includes a range from about 1.55 to about 1.8. In some embodiments, the ranges for low RI, high RI, and/or medium RI may overlap; however, in most instances, the layers of the anti-reflective coating 130 have the general relationship regarding RI of: low RI<medium RI<high RI (where "medium RI" is applicable in the case of a three layer period). In one or more embodiments, the difference in the refractive index of the low RI layer and the high RI layer may be about 0.01 or greater, about 0.05 or greater, about 0.1 or greater, or even about 0.2 or greater.

For example, in FIG. 4 the period 132 may include a low RI layer 130A and a high RI layer 130B. When a plurality of periods are included in the optical coating 120, the low RI layers 130A (designated as "L") and the high RI layers 130B (designated as "H") alternate in the following sequence of layers: L/H/L/H . . . or H/L/H/L . . . , such that the low RI layers and the high RI layers alternate along the physical thickness of the optical coating 120. In the embodiment depicted in FIG. 4, the anti-reflective coating 130 includes four periods 132, where each period 132 includes a low RI layer 130A and a high RI layer 130B. In some embodiments, the anti-reflective coating 130 may include up to 25 periods. For example, the anti-reflective coating 130 may include from about 2 to about 20 periods, from about 2 to about 15 periods, from about 2 to about 10 periods, from about 2 to about 12 periods, from about 3 to about 8 periods, or from about 3 to about 6 periods.

Example materials suitable for use in the anti-reflective coating 130 include, without limitation, $SiO_2$, $Al_2O_3$, $GeO_2$, SiO, AlOxNy, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in a low RI layer 130A include, without limitation, $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in a low RI layer 130A may be minimized (e.g., in materials such as $Al_2O_3$ and $MgAl_2O_4$). Some examples of suitable materials for use in a high RI layer 130B include, without limitation, $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, and diamond-like carbon. In one or more embodiments, the high RI layer 130B may have high hardness (e.g., hardness of greater than 8 GPa), and the high RI materials listed above may comprise high hardness and/or scratch resistance. The oxygen content of the materials for the high RI layer 130B may be minimized, especially in $SiN_x$ or $AlN_x$ materials. $AlO_xN_y$ materials may be considered to be oxygen-doped $AlN_x$ (i.e., they may have an $AlN_x$ crystal structure (e.g., wurtzite) and need not have an AlON crystal structure). Exemplary $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary $Si_uAl_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Where a material having a medium refractive index is desired, some embodiments may utilize AlN and/or $SiO_xN_y$. It should be understood that a scratch-resistant layer 150 may comprise any of the materials disclosed as suitable for use in a high RI layer.

In one or more embodiments, such as depicted in FIG. 4, the optical coating 120 may comprise a scratch-resistant layer 150 that is integrated as a high RI layer, and one or more low RI layers 130A and high RI layers 130B may be positioned over the scratch-resistant layer 150. The scratch-resistant layer may be alternately defined as the thickest high RI layer in the overall optical coating 120 or in the overall coated article 100. Without being bound by theory, it is believed that the coated article 100 may exhibit increased hardness at indentation depths when a relatively thin amount of material is deposited over the scratch-resistant layer 150. However, the inclusion of low RI and high RI layers over the scratch-resistant layer 150 may enhance the optical properties of the coated article 100. In some embodiments, relatively few layers (e.g., only 1, 2, 3, 4, or 5 layers) may positioned over the scratch-resistant layer 150 and these layers may each be relatively thin (e.g. less than 100 nm, less than 75 nm, less than 50 nm, or even less than 25 nm).

According to one or more embodiments, the scratch-resistant layer 150 may comprise one or more light-altering features. Incorporating light-altering features into the scratch-resistant layer 150 may serve to reduce oscillations in the reflectance and/or transmittance spectrum of the coated article 100 where a large percentage of the reflective interference of the coated article occurs at the interfaces 155 of the scratch-resistant layer. For example, as shown in FIG. 4, the interfaces 155 adjacent the scratch-resistant layer 150 may be rough, as described herein. One or both of interfaces 155 may be rough. In some embodiments, additional interfaces, such as those between layers 130A and 130B, and/or those between 130B and 140, or even the air-side surface 122 of the coated article 100 may be rough. Alternatively, or in addition to the above, the substrate surface 112 may be rough, and/or at the interface between the substrate surface 112 and the optical coating 130A may be rough.

In one or more embodiments, other light-altering features may be present in the scratch-resistant layer 150. For example, light-scattering members 180, as described herein, may be deposited in the scratch-resistant layer 150 or at the interfaces 155. In additional embodiments, other layers of the optical coating 120 may comprise light-altering features, such as the high RI layers 130B or low RI layers 130A. Alternatively, or in addition to the above, the light-scattering members 180 may be present on or in the substrate 110 (including on one or more of surfaces 112 and 114), and/or at the interface between the substrate 110 and the optical coating 120.

In one or more embodiments, the optical coating 120 may include one or more additional top coatings 140 disposed on the anti-reflective coating 130, as shown in FIG. 4. In one or more embodiments, the additional top coating 140 may include an easy-to-clean coating. An example of a suitable an easy-to-clean coating is described in U.S. Pub. No. 2014/0113083, which is incorporated herein in its entirety by reference. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g. fluorosilanes), phosphonates, alkenes, and alkynes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm, from about 7 nm to about 10 nm, from about 1 nm to about 90 nm, from about 5 nm to about 90 nm, from about 10 nm to about 90 nm, or from about 5 nm to about 100 nm, and all ranges and sub-ranges therebetween.

The top coating 140 may include a scratch-resistant layer or layers which comprise any of the materials disclosed as being suitable for use in the scratch-resistant layer 150. In some embodiments, the additional coating 140 includes a combination of easy-to-clean material and scratch-resistant material. In one example, the combination includes an easy-to-clean material and diamond-like carbon. Such additional top coatings 140 may have a thickness in the range from about 5 nm to about 20 nm. The constituents of the additional coating 140 may be provided in separate layers. For example, the diamond-like carbon may be disposed as a first layer and the easy-to clean can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean may have a thickness of about 1 nm to about 10 nm (or more specifically about 6 nm). The diamond-like coating may include tetrahedral amorphous carbon (Ta—C), Ta—C:H, and/or a-C—H.

In one or more embodiments, at least one of the layers (such as a low RI layer 130A or a high RI layer 130B) of the anti-reflective coating 130 may include a specific optical thickness (or optical thickness range). As used herein, the term "optical thickness" refers to the product of the physical thickness and the refractive index of a layer. In one or more embodiments, at least one of the layers of the anti-reflective coating 130 may have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the anti-reflective coating 130 may each have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, at least one layer of the anti-reflective coating 130 has an optical thickness of about 50 nm or greater. In some embodiments, each of the low RI layers 103A have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, each of the high RI layers 130B have an optical thickness in the range from about 2 nm to about 200 nm, from about 10 nm to about 100 nm, from about 15 nm to about 100 nm, from about 15 to about 500 nm, or from about 15 to about 5000 nm. In embodiments with a three layer period, each of the medium RI layers have an optical thickness in the range from about 2 nm to about 200 nm, from about 10 nm to about 100 nm, from about 15 nm to about 100 nm, from about 15 to about 500 nm, or from about 15 to about 5000 nm. In some embodiments, the scratch resistant layer is the thickest layer in the optical coating, and/or has an index of refraction higher than that of any other layer in the optical coating.

Figure 5:
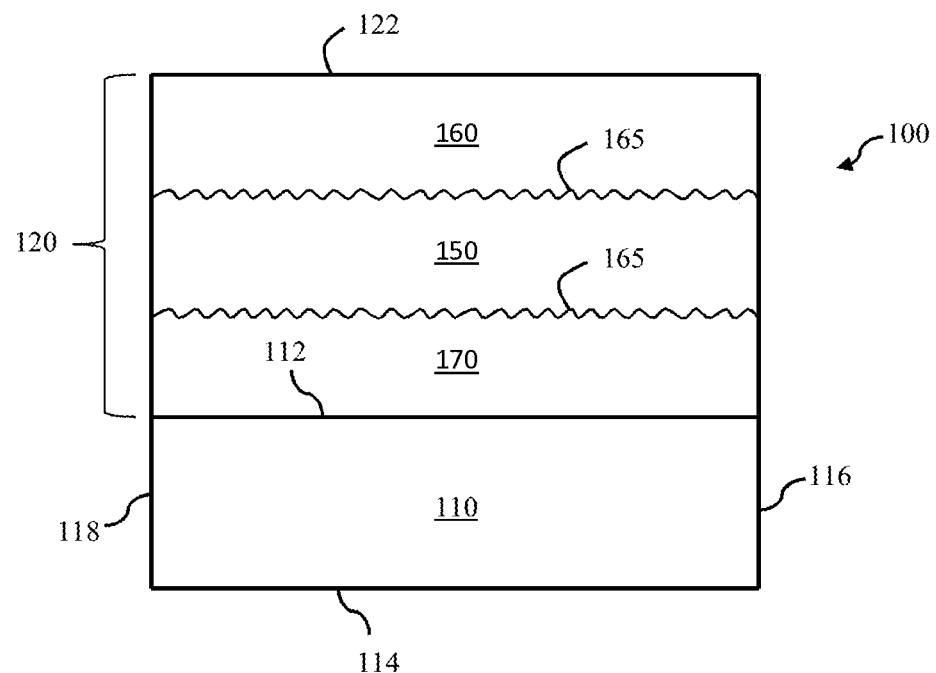
FIG. 5 is a cross-sectional side view of a coated article, according to one or more embodiments described herein.
Figure 6:
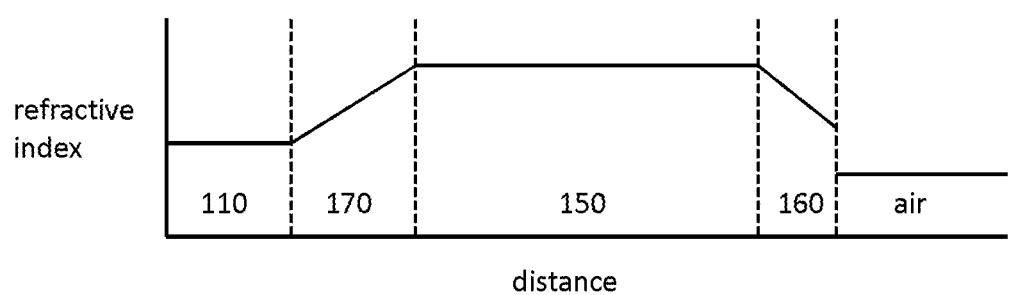
FIG. 6 is a plot of refractive index as a function of distance in the coated article of FIG. 5, according to one or more embodiments described herein.

In one or more embodiments, the optical coating may comprise one or more gradient layers, which each may comprise a compositional gradient along their respective thicknesses, as shown in FIG. 5. In one embodiment, the optical coating 120 may comprise a bottom gradient layer 170, a scratch-resistant layer 150 (as described above), and a top gradient layer 160. FIG. 6 depicts an example refractive index profile of an optical coating 120 of FIG. 5. The substrate 110, bottom gradient layer 170, scratch-resistant layer 150, and top gradient layer 160 are marked in their corresponding portions on the refractive index profile of FIG. 6. The bottom gradient layer 170 may be positioned in direct contact with the substrate 110. The scratch-resistant layer 150 may be over the bottom gradient layer 170, and the top gradient layer may be in direct contact and over the scratch-resistant layer 150. The scratch-resistant layer 150 may comprise one or more relatively hard materials with high refractive indices, such as $SiN_x$. In embodiments, the thickness of the scratch-resistant layer 150 may be from about 300 nm to several microns, such as is described with reference to the scratch-resistant layer 150 in other embodiments. The bottom gradient layer 170 may have a refractive index which varies from about the refractive index of the substrate (which may be relatively low) in portions which contact the substrate 110 to the refractive index of the scratch-resistant layer 150 (which may be relatively high) in portions that contact the scratch-resistant layer 150. The bottom gradient layer 170 may have a thickness of from about 10 nm to several microns, such as 50 nm to 1000 nm, 100 nm to 1000 nm, or 500 nm to 1000 nm. The top gradient layer 160 may have a refractive index which varies from about the refractive index of the scratch-resistant layer 150 (which may be relatively high) at portions which contact the scratch-resistant layer 150 to a relatively low refractive index at the air interface at the air-side surface 122. The uppermost portion of the top gradient layer 160 (at the air-side surface 122) may comprise materials with a refractive index of 1.35 to 1.55, such as, but not limited to, silicate glass, silica, phosphorous glass, or magnesium fluoride.

As described in other embodiments of coated articles 100, the scratch-resistant layer 150 may include light-altering features, such as rough interfaces 165 or light-scattering members (depicted in other embodiments). Alternatively, or in addition to the above, the light-altering features may be present on or in the substrate on which the optical coating is disposed, and/or at the interface between the substrate and the optical coating (specifically the bottom gradient layer).

In one or more embodiments, the refractive index of the bottom gradient layer 170 at the substrate may be within 0.2 (such as within 0.15, 0.1, 0.05, 0.02, or 0.01) of the refractive index of the substrate 110. The refractive index of the bottom gradient layer 170 at the scratch-resistant layer 150 may be within 0.2 (such as within 0.15, 0.1, 0.05, 0.02, or 0.01) of the refractive index of the scratch-resistant layer 150. The refractive index of the top gradient layer 160 at the scratch-resistant layer 150 may be within 0.2 (such as within 0.15, 0.1, 0.05, 0.02, or 0.01) of the refractive index of the scratch-resistant layer 150. The refractive index of the top gradient layer 160 at the air-side surface 122 may be from about 1.35 to about 1.55. In embodiments, the refractive index of the scratch-resistant layer may be at least about 1.75, 1.8, or even 1.9.

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate 110 may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

The term "strain-to-failure" refers to the strain at which cracks propagate in the optical coating 120, substrate 110, or both simultaneously without application of additional load, typically leading to catastrophic failure in a given material, layer or film and, perhaps even bridge to another material, layer, or film, as defined herein. That is, breakage of the optical coating 120 without breakage of the substrate constitutes failure, and breakage of the substrate 110 also constitutes failure. The term "average" when used in connection with average strain-to-failure or any other property is based on the mathematical average of measurements of such property on 5 samples. Typically, crack onset strain measurements are repeatable under normal laboratory conditions, and the standard deviation of crack onset strain measured in multiple samples may be as little as 0.01% of observed strain. Average strain-to-failure as used herein was measured using Ring-on-Ring Tensile Testing. However, unless stated otherwise, strain-to-failure measurements described herein refer to measurements from the ring-on-ring testing, as described in International Publication No. WO18/125676, entitled "Coated Articles with Optical Coatings Having Residual Compressive Stress," which is incorporated herein by reference in its entirety.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. In some examples, Young's modulus may be measured by sonic resonance (ASTM E1875), resonant ultrasound spectroscopy, or nanoindentation using Berkovich indenters.

In one or more embodiments, an amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 of one or more embodiments may have a hardness that is less than the hardness of the article (as measured by the Berkovich Indenter Hardness Test described herein). The hardness of the substrate 110 is measured using the Berkovich Indenter Hardness Test.

The substrate 110 may be substantially optically clear, transparent and free from light scattering. In such embodiments, the substrate 110 may exhibit an average light transmittance over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmittance over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single-side of the substrate (i.e., on the air-side surface 122 only, without taking into account the opposite surface). Unless otherwise specified, the average reflectance or transmittance of the substrate alone is measured at an incident illumination angle of 0 degrees relative to the substrate surface 112 (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110 is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. Pat. No. 8,561,429, in which glass substrates are strengthened by immersion in multiple, successive, ion exchange treatments in salt baths of different concentrations; and U.S. Pat. No. 8,312,739, in which glass substrates are strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The degree of chemical strengthening achieved by ion exchange may be quantified based on the parameters of central tension (CT), surface CS, depth of compression (DOC), and depth of layer of potassium ions (DOL). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The maximum CT values are measured using a scattered light polariscope (SCALP) technique known in the art.

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). The DOC may be from 0.05 times the thickness (t) of the substrate to about 0.3·t, for example from about 0.05·t to about 0.25·t, or from about 0.05·t to about 0.24·t, or from about 0.05·t to about 0.23·t, or from about 0.05·t to about 0.22·t, or from about 0.05·t to about 0.21·t or from about 0.05·t to about 0.20·t, or from about 0.05·t to about 0.19·t, or from about 0.05·t to about 0.18·t. In one or more specific embodiments, the strengthened substrate has one or more of the following: a surface CS greater than 500 MPa, a DOL greater than 15 μm, a DOC of from about 0.05·t to about 0.22·t, and a CT greater than 18 MPa.

Example glasses that may be used in the substrate 110 may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate 110 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate 110 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma$modifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$modifiers (i.e., sum of modifiers) is greater than 1.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate 110 may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm in various portions of the substrate 110. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

The optical coating 120 and/or the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the air-side surface 122 of the coated article 100 (or the surface of any one or more of the layers in the anti-reflective coating) with the diamond Berkovich indenter to form an indent to an indentation depth in the range from about 50 nm to about 1000 nm (or the entire thickness of the optical coating 120, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness as measured along a range of indentation depths, and not an average hardness.

Typically, in nanoindentation measurement methods (such as by using a Berkovich indenter) where the coating is harder than the underlying substrate, the measured hardness may appear to increase initially due to development of the plastic zone at shallow indentation depths (e.g., less than 25 nm or less than 50 nm) and then increases and reaches a maximum value or plateau at deeper indentation depths (e.g., from 50 nm to about 500 nm or 1000 nm). Thereafter, hardness begins to decrease at even deeper indentation depths due to the effect of the underlying substrate. Where a substrate having a greater hardness compared to the coating is utilized, the same effect can be seen; however, the hardness increases at deeper indentation depths due to the effect of the underlying substrate.

The indentation depth range and the hardness values at certain indentation depth ranges can be selected to identify a particular hardness response of the optical coatings 120 and layers thereof, described herein, without the effect of the underlying substrate 110. When measuring hardness of the optical coating 120 (when disposed on a substrate 110) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 110. The influence of the substrate on hardness occurs at deeper indentation depths (i.e., typically at depths greater than about 10% of the optical coating 120). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but, instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical coating thickness.

In one or more embodiments, the coated article 100 may exhibit a hardness of about 10 GPa or greater or about 12 GPa or greater (e.g., 14 GPa or greater, 16 GPa or greater, 18 GPa or greater, or even 20 GPa or greater), as measured on the air-side surface 122, by a Berkovich Indenter Hardness Test. In one or more embodiments, the optical coating 120 may exhibit a maximum hardness of about 10 GPa or greater, or about 12 GPa or greater (e.g., 14 GPa or greater, 16 GPa or greater, 18 GPa or greater, or even 20 GPa or greater) as measured on the air-side surface 122 by a Berkovich Indenter Hardness Test. Additionally, the hardness of the material of a high RI layer 130B and/or scratch-resistant layer 150 may be characterized specifically. In some embodiments, the maximum hardness of the high RI layer and/or the scratch-resistant layer 150, as measured by the Berkovich Indenter Hardness Test, may be about 8 GPa or greater, about 10 GPa or greater, about 12 GPa or greater, about 15 GPa or greater, about 18 GPa or greater, or even about 20 GPa or greater. A layer's hardness may be measured by analyzing a coated article where the layer measured is the uppermost layer. If the layer to be measured for hardness is a buried layer, its hardness may be measured by producing a coated article which does not include the overlying layers and subsequently testing the coated article for hardness. Such measured hardness values may be exhibited by the coated article 100, optical coating 120, high RI layer 130B, and/or scratch-resistant layer 150 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the air-side surface 122).

Optical interference between reflected waves from the optical coating 120/air interface and the optical coating 120/substrate 110 interface can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. As used herein, an "average transmittance" refers to the average amount of incident optical power transmitted through a material over a defined wavelength regime. As used herein, an "average reflectance" refers to the average amount of incident optical power reflected by the material. Reflectance may be measured as a single-side (or first side) reflectance when measured at the air-side surface 122 only (e.g., when removing the reflections from an uncoated back surface (e.g., 114 in FIG. 3) of the coated article 100, such as through using index-matching oils on the back surface coupled to an absorber, or other known methods). In one or more embodiments, the spectral resolution of the characterization of the transmittance and reflectance is less than 5 nm or 0.02 eV. The color may be more pronounced in reflection. The angular color may shift in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmittance may also play a factor in color shift in reflection and vice versa. Factors in angular color shifts in transmittance and/or reflectance may also include angular color shifts due to viewing angle or angular color shifts away from a certain white point that may be caused by material absorption (somewhat independent of angle) defined by a particular illuminant or test system.

The articles described herein exhibit an average light transmittance and a single-side average light reflectance over a specified wavelength ranges in or near the visible spectrum. Additionally, the articles described herein exhibit an average visible photopic reflectance and an average visible photopic reflectance over a specified wavelength ranges in or near the visible spectrum. In embodiments, the wavelength ranges (sometimes referred to herein as a "wavelength regime") for measuring average light transmittance, single-side average light reflectance, average visible photopic reflectance, and average visible photopic reflectance may be from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm; unless otherwise specified these quantities are given for the wavelength regime of about 420 nm to about 700 nm. Unless otherwise specified, the average light transmittance, single-side average light reflectance, average visible photopic reflectance, and average visible photopic reflectance are measured at an incident illumination angle near normal to the air-side surface 122, such as at an angle of incidence of from about 0 degrees to about 10 degrees (however, such measurements may be collected at other incident illumination angles, such as, e.g., 30 degrees, 45 degrees, or 60 degrees).

In one or more embodiments, a coated article 100 may exhibit an average single-side light reflectance (which may be a photopic average, and which may be the specular reflectance) of about 50% or less, 40% or less, 30% or less, 20% or less, 10% or less, 9% or less, about 8% or less, about 7% or less, about 6% or less, about 5% or less, about 4% or less, about 3% or less, about 2% or less, about 1% or less, about 0.5% or less, about 0.4% or less, about 0.3% or less, or about 0.2% or less, about 0.15% or less, about 0.1% or less, or even about 0.05% or less over the optical wavelength regime, when measured at the air-side surface 122 only (e.g., when removing the reflections from an uncoated back surface of the article, such as through using index-matching oils on the back surface coupled to an absorber, or other known methods). In embodiments, the average single-side light reflectance may be in the range from about 0.4% to about 9%, from about 0.4% to about 8%, from about 0.4% to about 7%, from about 0.4% to about 6%, or from about 0.4% to about 5%. In embodiments, the average single-side light reflectance may be in the range from about 0.2% to about 9%, from about 0.2% to about 8%, from about 0.2% to about 7%, from about 0.2% to about 6%, or from about 0.2% to about 5%. In one or more embodiments, the coated article 100 exhibits an average light transmittance of about 50% or greater, 60% or greater, 70% or greater, 80% or greater, 90% or greater, 92% or greater, 94% or greater, 96% or greater, 98% or greater, or 99% or greater, over an optical wavelength regime. In embodiments, the coated article 100 may exhibit a light transmittance in the range from about 99.5 to about 90%, 92%, 94%, 96%, 98%, or 99%.

In some embodiments, the coated article 100 may exhibit an average visible photopic reflectance of about 50% or less, 40% or less, 30% or less, 20% or less, 10% or less, about 9% or less, about 8% or less, about 7% or less, about 6% or less, about 5% or less, about 4% or less, about 3% or less, about 2% or less, about 1% or less, about 0.8% or less, about 0.7% or less, about 0.6% or less, about 0.5% or less, about 0.4% or less, about 0.3% or less, or about 0.25% or less, about 0.15% or less, about 0.1% or less, or even about 0.05% or less over an optical wavelength regime. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in the below equation as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda$$

In some embodiments, the article 100 may exhibit an average visible photopic transmittance of about 50% or greater, 60% or greater, 70% or greater, 80% or greater, about 85% or greater, about 90% or greater, about 92% or greater, about 94% or greater, about 96% or greater, or even about 98% or greater, over an optical wavelength regime. The average photopic transmittance is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380\,nm}^{720\,nm} T(\lambda) \times I(\lambda) \times \bar{y}(\lambda) d\lambda$$

In one or more embodiments, the coated article 100 exhibits a measurable color (or lack thereof) in reflectance and transmittance in the CIE L*a*b* colorimetry system (referred to herein as a "color coordinate"). The transmittance color coordinates refer to the observed L*a*b* color coordinates in transmittance and the reflectance color coordinates refer to the observed L*a*b* color coordinates in reflectance. The transmittance color coordinates or reflectance color coordinates may be measured under a variety of illuminant light types, which may include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). Specific illuminants include F2, F10, F11, F12 or D65, as defined by CIE. Additionally, the reflectance color coordinates and transmittance color coordinates may be measured at different observed angles of incidence, such as normal (0 degrees), 5 degrees, 10 degrees, 15 degrees, 20 degrees, 30 degrees, 40 degrees, 45 degrees, or 60 degrees.

In one or more embodiments, the coated article 100 has a* of less than or equal to about 10, 8, 6, 5, 4, 3, 2, or even 1 in transmittance and/or reflectance when viewed at a normal angle of incidence, or an angle of incidence of 5 degrees, 10 degrees, 15 degrees, 20 degrees, 30 degrees, 40 degrees, 45 degrees, or 60 degrees. In one or more embodiments, the coated article 100 has b* of less than or equal to about 10, 8, 6, 5, 4, 3, 2, or even 1 in transmittance and/or reflectance when viewed at a normal angle of incidence, or an angle of incidence of 5 degrees, 10 degrees, 15 degrees, 20 degrees, 30 degrees, 40 degrees, 45 degrees, or 60 degrees. In one or more embodiments, the coated article 100 has a* of greater than or equal to about −10, −8, −6, −5, −4, −3, −2, or even −1 in transmittance and/or reflectance when viewed at a normal angle of incidence, or an angle of incidence of 5 degrees, 10 degrees, 15 degrees, 20 degrees, 30 degrees, 40 degrees, 45 degrees, or 60 degrees. In one or more embodiments, the coated article 100 has b* of greater than or equal to about −10, −8, −6, −5, −4, −3, −2, or even −1 in transmittance and/or reflectance when viewed at a normal angle of incidence, or an angle of incidence of 5 degrees, 10 degrees, 15 degrees, 20 degrees, 30 degrees, 40 degrees, 45 degrees, or 60 degrees.

In one or more embodiments, a reference point color shift may be measured between a reference point and the transmittance color coordinates or reflectance color coordinates. The reference point color shift measures the difference in color between a reference point color coordinate and an observed color coordinate (either reflected or transmitted). The reflectance reference point color shift (sometimes referred to as the reference point color shift in reflectance) refers to the difference between the reflected color coordinate and the reference point. The transmittance reference point color shift (sometimes referred to as the reference point color shift in transmittance) refers to the difference between the transmitted color coordinates and the reference point. To determine the reference point color shift, a reference point is chosen. According to embodiments described herein, the reference point may be the origin in the CIE L*a*b* colorimetry system (the color coordinates a*=0, b*=0), the coordinates (a*=−2, b*=−2), or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate. Unless otherwise noted, the reference point color shift refers to the shift measured between the reference point and the color coordinate in transmittance or reflectance as measured at a normal angle relative to the air-side surface 122 of the coated article 100. However, it should be understood that the reference point color shift may be determined based on non-normal angles of incidence, such as 5 degrees, 10 degrees, 15 degrees, 20 degrees, 30 degrees, 40 degrees, 45 degrees, or 60 degrees. Additionally, unless otherwise noted, the reflectance color coordinates are measured on only the air-side surface 122 of the article. However, the reflectance color coordinates described herein can be measured on both the air-side surface 122 of the article and the opposite side of the article (i.e., major surface 114 in FIG. 1) using either a 2-surface measurement (reflections from two sides of an article are both included) or a 1-surface measurement (reflection only from the air-side surface 122 of the article is measured). Of these, the 1-surface reflectance measurement is typically the more challenging metric to achieve low reference point color shift values for anti-reflective coatings, and this has relevance to applications (such as smartphones, etc.) where the back surface of the article is bonded to a light absorbing medium such as black ink or an LCD or OLED device).

Where the reference point is the color coordinates a*=0, b*=0 (the origin), the reference point color shift is calculated by the following equation: reference point color shift=$\sqrt{((a^*_{article})^2+(b^*_{article})^2)}$.

Where the reference point is the color coordinates a*=−2, b*=−2, the reference point color shift is calculated by the following equation: reference point color shift=$\sqrt{((a^*_{article}+2)^2+(b^*_{article}+2)^2)}$.

Where the reference point is the color coordinates of the substrate, the reference point color shift is calculated by the following equation: reference point color shift=$\sqrt{((a^*_{article}-a^*_{substrate})^2+(b^*_{article}-b^*_{substrate})^2)}$.

In one or more embodiments, the reference point color shift in reflectance and/or transmittance is less than about 10, less than about 9, less than about 8, less than about 7, less than about 6, less than about 5, less than about 4, less than about 3, less than about 2.5, less than about 2, less than about 1.8, less than about 1.6, less than about 1.4, less than about 1.2, less than about 1, less than about 0.8, less than about 0.6, less than about 0.4, or even less than about 0.25, as measured relative to one of the disclosed reference points.

One aspect of this disclosure pertains to a coated article 100 that exhibits colorlessness in reflectance and/or transmittance even when viewed at a non-normal angle of incidence under an illuminant. In one or more embodiments, the coated articles 100 described herein may have a minimal change in visible color in reflectance and/or transmittance when the viewing angle is changed, or the same color may be perceived with angular shift. Such can be characterized by the angular color shift of a coated article 100 in reflectance or transmittance. Angular color shift may be determined using the following equation, where: angular color shift=$\sqrt{((a^*_2-a^*_1)^2+(b^*_2-b^*_1)^2)}$. In the angular color shift equation, $a^*_1$, and $b^*_1$ represent the a* and b* coordinates of the article when viewed at a reference illumination angle (which may include normal incidence) and $a^*_2$, and $b^*_2$ represent the a* and b* coordinates of the article when viewed at an incident illumination angle, provided that the incident illumination angle is different from the reference illumination angle and in some cases differs from the reference illumination angle by at least about 1 degree, 2 degrees or about 5 degrees. It should be understood that unless otherwise noted, the L* coordinate of the articles described herein are the same at any angle or reference point and do not influence color shift.

The reference illumination angle may include normal incidence (i.e., 0 degrees), or, for example, 5 degrees, 10 degrees, 15 degrees, 20 degrees, 30 degrees, 40 degrees, 45 degrees, or 60 degrees from normal incidence. However, unless stated otherwise, the reference illumination angle is a normal angle of incidence, or a near-normal (i.e., within 10 degrees of normal) angle of incidence. The incident illumination angle may be, for example, about 5 degrees, 10 degrees, 15 degrees, 20 degrees, 30 degrees, 40 degrees, 45 degrees, or 60 degrees from the reference illumination angle. In one or more embodiments, the reference illumination angle may be in a range from 0 to 10 degrees and the incident illumination angle may be in a range from 30 to 60 degrees.

In one or more embodiments, the coated article 100 has an angular color shift in reflectance and/or transmittance from an incident illumination angle of from 0-10 degrees (e.g., 5 or less, 4 or less, 3 or less, or 2 or less) to an incident illumination angle in the range of 30-60 degrees under an illuminant. In some embodiments, the angular color shift in reflectance and/or transmittance is about 10 or less, 9 or less, 8 or less, 7 or less, 6 or less, 5 or less, 4 or less, 3 or less, 2 or less, 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at incident illumination angle from the reference illumination angle under a CIE F2, F10, F11, F12 or D65 illuminant, or more specifically, under a CIE F2 illuminant.

In one or more embodiments, the coated article 100 has an angular color shift in reflectance and/or transmittance of about 10 or less (e.g., 5 or less, 4 or less, 3 or less, or 2 or less) at all incident illumination angles in a given range relative to the reference illumination angle. For example, the coated article 100 may have an angular color shift of about 10 or less, 5 or less, 4 or less, 3 or less, or 2 or less at all incident illumination angles in a range from the reference illumination angle to about 5 degrees, 10 degrees, 15 degrees, 20 degrees, 30 degrees, 40 degrees, 45 degrees, or 60 degrees from the reference illumination angle. In additional embodiments, the coated article 100 may have an angular color shift of about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less at all incident illumination angles in a range from the reference illumination angle to about 5 degrees, 10 degrees, 15 degrees, 20 degrees, 30 degrees, 40 degrees, 45 degrees, or 60 degrees from the reference illumination angle.

In one or more embodiments, the coated article 100 exhibits a haze value of about 10% of less, as measured on the abraded side using a haze meter supplied by BYK Gardner under the trademark Haze-Gard Plus®, using an aperture over the source port, the aperture having a diameter of 8 mm. In some examples, the sample may be abraded first, with the haze then being measured after abrasion to quantify the severity of the abrasion. Unless otherwise specified, all values of haze used herein were measured in the foregoing manner. In some embodiments, the haze may be about 70% or less, 50% or less, about 25% or less, about 20% or less, about 15% or less, about 10% or less, about 9% or less, about 8% or less, about 7% or less, about 6% or less, about 5% or less, about 4% or less, about 3% or less, about 2% or less, about 1% or less, about 0.5% or less or about 0.3% or less. In some specific embodiments, the article 100 exhibits a haze in the range from about 0.1% to about 10%, from about 0.1% to about 9%, from about 0.1% to about 8%, from about 0.1% to about 7%, from about 0.1% to about 6%, from about 0.1% to about 5%, from about 0.1% to about 4%, from about 0.1% to about 3%, from about 0.1% to about 2%, from about 0.1% to about 1%, 0.3% to about 10%, from about 0.5% to about 10%, from about 1% to about 10%, from about 2% to about 10%, from about 3% to about 10%, from about 4% to about 10%, from about 5% to about 10%, from about 6% to about 10%, from about 7% to about 10%, from about 1% to about 8%, from about 2% to about 6%, from about 3% to about 5%, and all ranges and sub-ranges therebetween.

Reflectance Measurements—SCI, SCE, and (SCI-SCE)

In one or more embodiments, the article exhibits a total reflectance (SCI), a diffuse reflectance (SCE), and/or a specular reflectance (SCI-SCE). These reflectance values are measured using a Konica-Minolta CM700D with a 6 mm diameter aperture, by performing the following steps 1-19 in order.

1. Perform daily bench certification of the CM700d to ensure its proper functioning. Separate procedure as specified by Konica-Minolta.

2. Switch the instrument power on.

3. Turn on the program and establish connection with the instrument.

4. Calibrate the instrument as directed on the program.

5. Load a new SCE/SCI data-receiving spreadsheet template in the program

6. Clean the sample holder using compressed air with the cap still attached on the CM700d to avoid particles infiltrating the instrument from the open aperture.

7. Follow the cleaning procedure of steps a-d, in order, to clean the sample.

a. Dampen a piece of clean cloth with methanol and rub the two sample surfaces. Be careful not to erase any markings indicating the sample orientation.

b. Following the wet cleaning, immediately clean the sample dry by using a fresh piece of cloth and rub the two surfaces again until the methanol residues/smudges have been removed. Place the sample against a black background to inspect frequently.

c. Spray compressed air across the two surfaces of the sample to remove any the loose dust particles and fibers from the cloth.

d. Move the sample to the subsequent step.

8. Place the sample on the machine fixture using marker as indicator. Face the abraded side downward to the aperture of the CM700d. Please note the markers are facing upward but are still sitting along the top edge of the sample. The arrow will point upper left and the number is on the upper right now.

9. Label the measurement on the program. Measure three non-abraded locations (area between the tracks) as baseline and label them. The track close to the operator is designated as the bottom track while the other one is called the top track.

10. Slide the sample against top left corner of the fixture to measure the right spot on the top track and label it.

11. Slide the sample against the top edge until the edge is aligned with the mark to measure the middle spot on the top track and label it.

12. Slide the sample against the top edge to the top right corner to measure the left spot on the top track and label it. The centers of the right, middle, and left, spots, for each track should be spaced by the diameter of the aperture used for that particular test (6 mm unless specified otherwise). Also, the right, middle, and left, spots taken as a whole should be roughly centered across the length and width of the track being measured.

13. Repeat the whole process for the bottom track using the bottom edge and two bottom corners.

14. Make sure nine measurements were recorded (3 for each track, and 3 for the space between the tracks. If so, store this sample and measure another one if any.

Data analysis—using data calculation program (Matlab, for example)

15. Export measurement. Copy the entire pertinent data set on the CM700d program and paste it to an excel file. Save the excel file to a designated folder and make sure the folder also contains another excel file to receive output.

16. Use data calculation program (Matlab, for example) to calculate the following equation for each of the 9 spots to obtain 9 values for diffuse reflectance (SCE):

$$SCE^* = \frac{\sum_{\lambda_1}^{\lambda_n} SCE(\lambda_i) S(\lambda_i) Y(\lambda_i)}{\sum_{\lambda_1}^{\lambda_i} S(\lambda_i) Y(\lambda_i)}$$

where SCE* is the weighted average SCE; SCE is the raw measurement from the CM700d program for each wavelength; λ is the wavelength from 400 nm to 700 nm, incremented by 10 nm for each calculation; S is the D65 spectral illumination (CIE 1931 10 deg.); and Y is the spectral luminous efficiency function (CIE 1931 10 deg.).

17. Each number (SCE*) is a weighted average of the scattered component excluded (SCE) for that spot.

18. Take an average of the SCE values for each of the three spots in one track (either one of the abrasion tracks, or the space between abrasion tracks). This is the SCE value after abrasion for that sample track. 5. A change in SCE value can be calculated by taking the difference between the SCE value prior abrasion (as from the space between abrasion tracks) and the SCE value calculated by steps 1-4 for each abrasion track.

19. Total reflectance (SCI) is measured, and specular reflectance is then calculated by subtracting SCE from SCI.

Taber Abrasion Test

In one or more embodiments, the article is abraded before measuring various properties (SCI, SCE, and SCI-SCE) thereof. To abrade the article, a Taber Industries Linear Abraser 5750 was used by performing the following steps (1 to 18—Taber Abrasion Test) in order.

1. Check and make sure Taber abrader and the sample fixture, of the 5750 Linear Abraser, are leveled using a digital angle meter (Difference between Taber shaft and the sample holder should be less than 0.3 degrees).

2. Check lubrication of the spline. Move the steel spline up and down without any weights on it to see if there is clear sign of friction before starting each job. If there is a clear sign of friction, lubricate the spline.

3. Check the sample sitting area. Spray compressed air on the fixture and wipe-clean using methanol to get rid of loose particles/dust and oil to avoid any potential scratching and contamination on the opposite side of abrasion track.

4. Clean a coated article sample 270 (see FIG. 27) by spraying compressed air to remove loose dust particles. If needed, clean the sample 270 using methanol to remove grease and other types of contaminations, especially on the intended side of abrasion.

5. Identify the side of the sample 270 (see FIG. 27) to perform the abrasion/scratch on.

Figure 27:
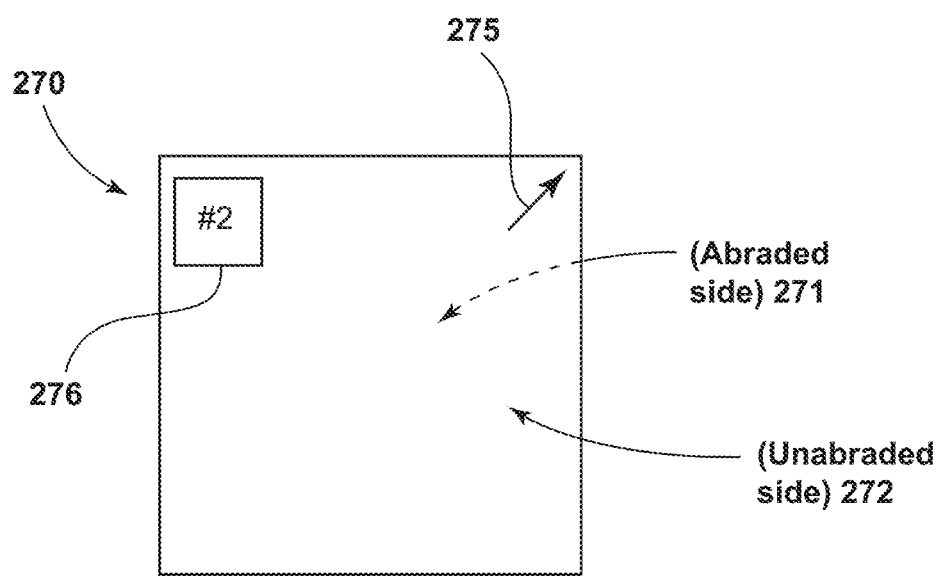
FIG. 27 is a schematic of a coated article sample for testing in a Taber Abrasion Test according to one or more embodiments described herein.

6. As shown in FIG. 27, make any markings on the sample 270 for orientation registration on the unabraded side 272 opposite to the intended abrading side 271. Mark the sample 270 for orientation registration (important) on the opposite side 272 to the intended abrading side 271. Use an arrow 275 pointing at one corner and put down a sample number 276 on the other side along the same edge.

7. Install the sample 270 on the sitting area. Face the intended abrading side 271 up.

8. Reface the wearaser tip. The exposed depth of the tip should be adjusted using the depth gauge and secure the eraser by tightening the collet. Glue the reface strip on the reface plate. Align the position of the track path on a fresh area of the strip each time using laser guide equipped on the Taber unit. Open the cover on the abrader and set the track length to 3 inches (75 mm). The reface condition should be set 25 cycles/min for 25 cycles. No additional weight needs to be place at this step. The total weight should be the addition of the individual weight of the spline, shaft, collet and the weight of the holder. (spline+shaft+weight holder+collet=350 g)

9. Start reface process by pressing the green start button on the Taber unit.

10. Take the collet off from the spline after the reface finishes and spray air to the tip of the wearaser to get rid of any loose particle.

11. Since reface remove certain depth of wearaser, thus shorten the exposed depth. Re-adjust the exposed depth of the wearaser using the depth gauge and reinstall the collet onto the spline.

12. Reset the length of abrasion track to 1 inch (25 mm) on the Taber unit.

13. Stack an additional 1 kg of external weight such that the total weight is 1350 g. Refer to the Taber manual for the individual weights of the component.

14. Move the fixture to a target location manually or by using the electric screw driver. Align the laser beam to one of the marking lines next to the sample sitting area.

15. Set the cycle speed (25 cycles/min, unless specified otherwise) and cycle counts (10, unless specified otherwise) on Taber.

16. Start the abrasion by pressing the green start button.

17. Repeat from step 8 to abrade another track on the same sample until desired number of tracks are made.

18. Take sample off the fixture for temporary storage after desired number of tracks (two unless specified otherwise) have been abraded. Repeat from Step 3 for each additional sample.

Kovax Test

For the Kovax Test, the Taber Linear Abraser was used according to the Taber Abrasion Test (described above), but with the following exceptions. Instead of a wearaser tip, there was used an abradant made of 400 grit 'Eagle' Aluminum oxide sandpaper available from Kovax, Tokyo, Japan. Steps 8 and 9 of the test then simply reduce to mounting a fresh piece of sandpaper on the tip instead of re-facing it. The Kovax Test can be carried out with various defined loads and cycles as set forth herein.

Garnet Scratch Test

For the Garnet Scratch Test, the Taber Linear Abraser was used according to the Taber Abrasion Test (described above), but with the following exceptions. Instead of a wearaser tip, there was used an abradant made of 150 grit garnet sandpaper made by 3M, Saint Paul, Minn. Steps 8 and 9 of the test then simply reduce to mounting a fresh piece of sandpaper on the tip instead of re-facing it. The Garnet Scratch Test can be carried out with various defined loads and cycles as set forth herein. Typically, the Garnet Scratch Test is performed with either 1 kg, 2 kg, or 4 kg total weight (including the weight of the spline, shaft, collet, and weight holder) on the Taber Linear Abraser.

Gloss Value Test

In one or more embodiments, the articles described herein exhibited a Gloss value. The measurement of Gloss value was carried out on a Rhopoint IQ™ instrument available from Rhopoint Instruments Ltd., as follows. Gloss is the visual sensation associated with the brightness of direct light reflected in a surface and describes the perception of a surface appearing "shiny" when light is reflected from it. Surfaces with high reflectance are determined as glossy; less reflective surfaces are semi-gloss or mat. Glossmeters quantify this effect by measuring light reflection from a sample at defined angles. The Gloss Unit (GU) is defined in international standards including ISO 2813 and ASTM D523. The GU is determined by the amount of reflected light from a glass standard of known refractive index. Conventional glossmeter optics are used for 60 and 85 degree angles, and these optics fully comply with the above-noted international gloss standards.

Distinctness of Image Test

In one or more embodiments, the articles described herein exhibited a Distinctness of Image (DOI) value. The measurement of DOI was carried out on a Rhopoint IQ™ (goniophotometer at a setting of 20 degrees incidence) available from Rhopoint Instruments Ltd., United Kingdom. The DOI value of a surface is a number between zero and one hundred; a surface that exhibits a perfect undistorted image returns a value of 100, as the value decreases the image becomes less discernible.

Pixel Power Deviation Test

In one or more embodiments, the articles described herein exhibited a Pixel Power Deviation (PPD) value. The measurement of PPD value was carried out as described in U.S. Pat. No. 9,411,180, entitled "Apparatus and Method for Determining Sparkle," which is incorporated herein by reference in its entirety. For example, the comparison of a reference display image without a test sample to the display image with a test sample (i.e., so the PPD value corresponds to that of the sample without variations from the display background).

EXAMPLES

Example 1

To produce a coated article, $BaF_2$ was deposited as a roughness-inducing light scattering layer on an ion-exchanged glass substrate (commercially available as GORILLA GLASS from Corning Inc.) Specifically, $BaF_2$ film growth through e-beam evaporation deposition at elevated temperature to creates a crown-type crystallite morphology leading to roughness. $BaF_2$ films were deposited at 3 Angstroms/second in a Temescal BJD-1800 e-beam evaporation unit with quartz lamps heating the substrate to about 200° C. Base pressure before deposition was $1.2 \times 10^{-6}$ torr. The roughness of the $BaF_2$ film increased as the film thickness increased due to the kinetics of crystallite nucleation and growth. Roughness was measured using a Veeco Dimension atomic force microscope. FIGS. 7A-7D depict micrograph images of deposited $BaF_2$ films on the glass substrate. Table 1 shows the $BaF_2$ thicknesses and roughness measurements for each coated sample, and additionally supplies a legend for FIGS. 7A-7D. Roughness was measured as $R_a$ (arithmetic average of absolute values roughness) and $R_q$ (root mean squared roughness). As a comparison, the glass substrate had a roughness ($R_a$ or $R_q$) of less than 1 nm.

TABLE 1

Figure 7A:
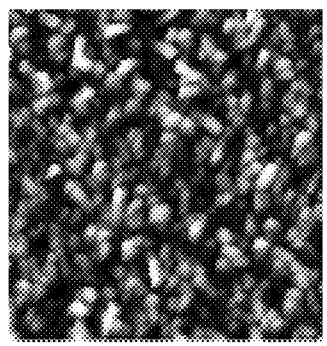
FIGS. 7A-7D depict atomic force micrographs of example $BaF_2$ coatings on a glass substrate, according to one or more embodiments described herein.
Figure 7B:
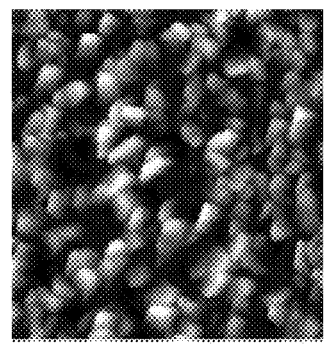
Figure 7C:
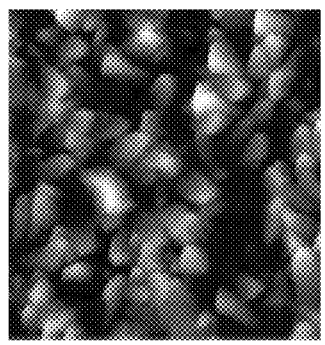
Figure 7D:
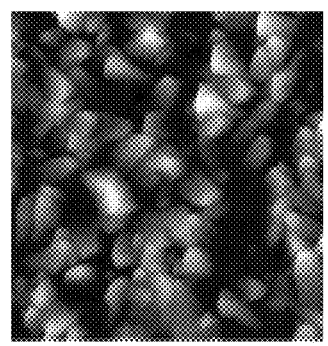

| FIG. | $BaF_2$ thickness (nm) | $R_a$ (nm) | $R_q$ (nm) |
|---|---|---|---|
| FIG. 7A | 300 | 7.88 | 9.65 |
| FIG. 7B | 600 | 15.1 | 18.6 |
| FIG. 7C | 1200 | 25.6 | 31.6 |
| FIG. 7D | 2400 | 33.4 | 41.9 |

Additionally, 2 micron layers of $SiN_x$ were deposited on top of $BaF_2$ layers described previously by PECVD using a Plasma-Therm HDPCVD at 150° C. The deposition utilized an inductively coupled plasma source to attain high ionization independent of substrate bias, which is set by a RF supply driving the platen on which the substrate sits. PECVD is a fairly conformal coating process, with relatively little roughness as deposited. The roughness of the $BaF_2$ layers was largely preserved after deposition of 2 microns of $SiN_x$ on top of the $BaF_2$ layers. FIGS. 8A-8D depict micrograph images of deposited $SiN_x$ films deposited over $BaF_2$ films on the glass substrate. Table 1 shows the $SiN_x$ layer and $BaF_2$ layer thicknesses and roughness measurements of the $SiN_x$ layer for each coated sample, and additionally supplies a legend for FIGS. 8A-8D.

TABLE 2

Figure 8A:
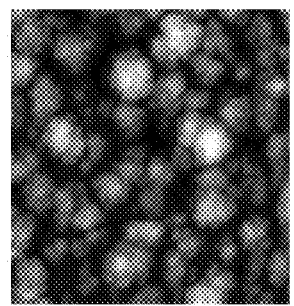
FIGS. 8A-8D depict atomic force micrographs of example $SiN_x$ coatings deposited over $BaF_2$ coatings on a glass substrate, according to one or more embodiments described herein.
Figure 8B:
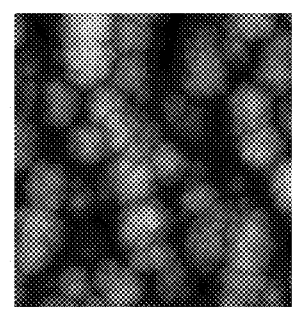
Figure 8C:
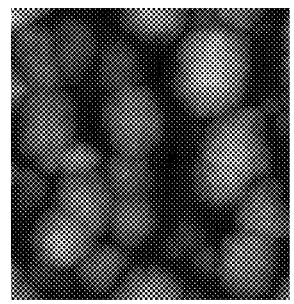
Figure 8D:
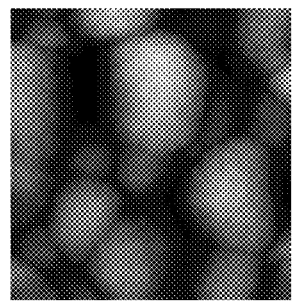

| FIG. | $BaF_2$ thickness (nm) | $SiN_x$ thickness (nm) | $R_a$ (nm) | $R_q$ (nm) |
|---|---|---|---|---|
| FIG. 8A | 300 | 2000 | 6.08 | 7.73 |
| FIG. 8B | 600 | 2000 | 10.8 | 13.6 |
| FIG. 8C | 1200 | 2000 | 17.3 | 17.3 |
| FIG. 8D | 2400 | 2000 | 33.3 | 33.3 |

The Glass Substrate/$BaF_2$/$SiN_x$ coated articles had Berkovich indentation hardness values of 17-21 GPa, whereas the uncoated substrate had a hardness of about 7 GPa. Modulus values were measured for these samples and were in the range of 192-212 GPa.

Figure 9:
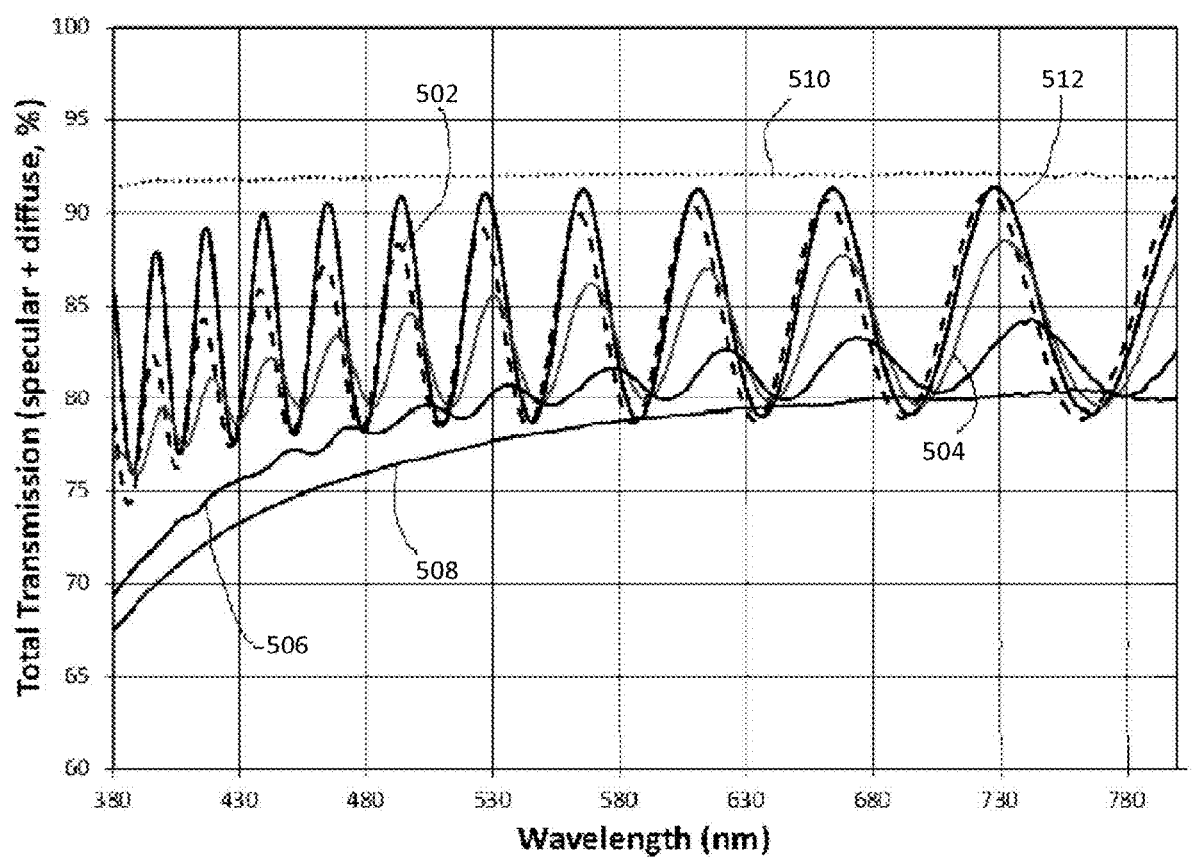
FIG. 9 is a graph depicting total transmittance as a function of wavelength for example coatings, according to one or more embodiments described herein.
Figure 10:
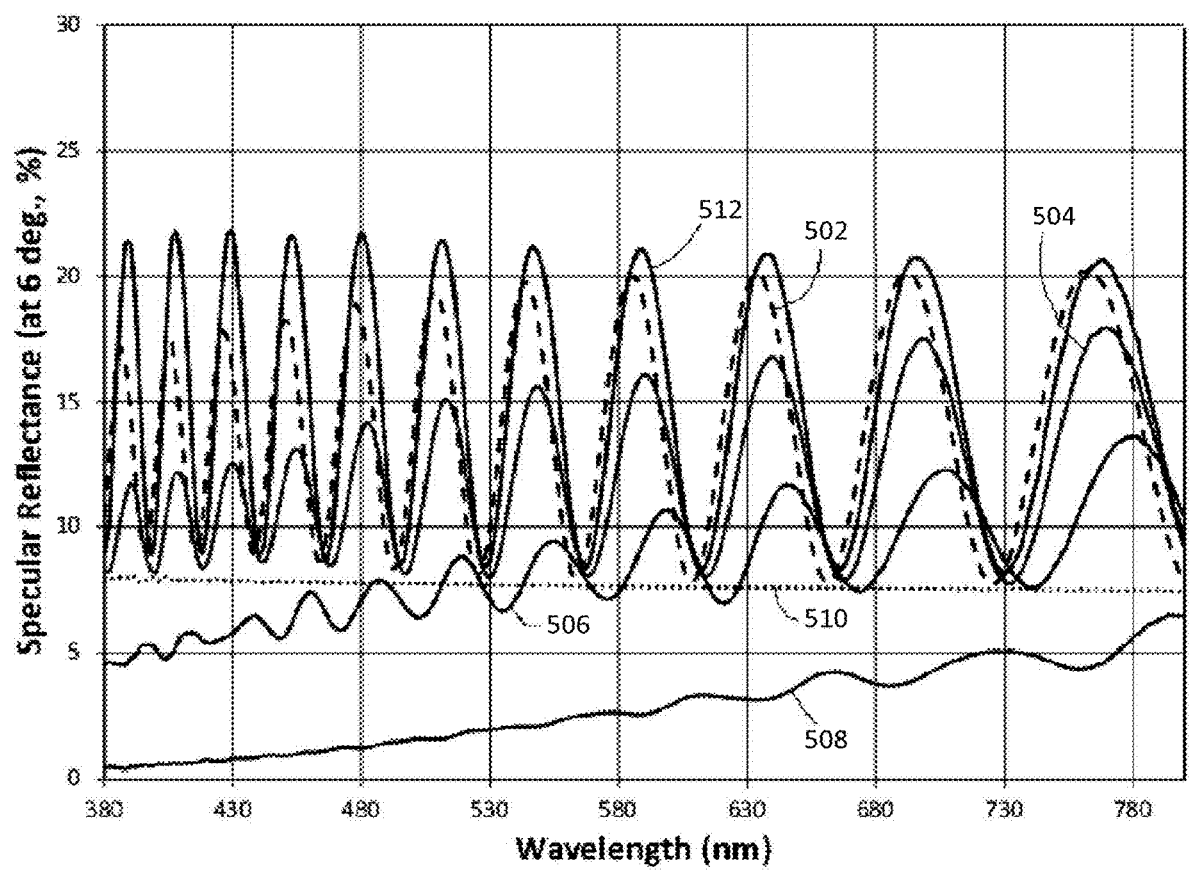
FIG. 10 is a graph depicting specular reflectance as a function of wavelength for example coatings, according to one or more embodiments described herein.

The fabricated samples were evaluated for total transmittance and specular reflectance across the visible spectrum. FIG. 9 depicts the total transmittance (sum of specular and diffuse light) as a function of wavelength. FIG. 10 depicts the specular reflectance (at 6° angle of incidence) as a function of wavelength. In FIGS. 9 and 10, respectively, reference number 502 represents the sample with a 300 nm $BaF_2$ layer and a 2000 nm $SiN_x$ coating, reference number 504 represents the sample with a 600 nm $BaF_2$ layer and a 2000 nm $SiN_x$ coating, number 506 represents the sample with a 1200 nm $BaF_2$ layer and a 2000 nm $SiN_x$ coating, and number 508 represents the sample with a 2400 nm $BaF_2$ layer and a 2000 nm $SiN_x$ coating. Additionally, reference number 510 represents a comparative example of uncoated substrate and reference number 512 represents a glass substrate coated only with 2 microns of $SiN_x$ (a relatively smooth coating). As shown in FIGS. 9 and 10, the sharp spectral oscillations are smoothed in transmittance as well as in reflection with the addition of a rough layer, and oscillations smooth with increased roughness.

The samples were additionally evaluated for reflective angular color shift (from 6 degrees to 40 degrees with F2 illuminant, the sample measured at 40 degrees being compared to itself when measured at 6 degrees), haze, and total average photopic transmittance with (D65 illuminant). Results are shown in Table 3.

TABLE 3

| $BaF_2$ thickness (nm) | $SiN_x$ thickness (nm) | Angular Color Shift (6° to 40°) | | | Average Photopic Transmittance (D65) |
|---|---|---|---|---|---|
| | | a* | b* | Haze | |
| 300 | 2000 | 1.3 | 3.1 | 2.4 | 83.9 |
| 600 | 2000 | 1.7 | 4.0 | 6.6 | 82.7 |
| 1200 | 2000 | 0.4 | 2.7 | 20.3 | 80.1 |
| 2400 | 2000 | 1.1 | 2.7 | 52 | 78.0 |
| 0 | 0 | 0.01 | 0.05 | 0.2 | 92.0 |
| 0 | 2000 | 2.3 | 5.8 | 0.2 | 84.7 |

While specular reflectance is significantly reduced by the inclusion of a rough $BaF_2$ layer, total transmittance is substantially maintained, only dropping very marginally (from about 85% total photopic average transmittance to about 78% for a 2400 nm thick $BaF_2$ layer, as shown in Table 3. It is believed that thicker layers of $BaF_2$ introduce more light scattering, which smooths the spectral oscillations and reduces the specular reflectance. It is also believed that the reduction in specular reflectance effect is related to the traditional "anti-glare" effect of rough surfaces. Additionally, the samples incorporating the rough $BaF_2$ light scattering centers show a smaller range of variation in reflected color with angular change, due to the spectral smoothing created by the light scattering. The samples with a thicker $BaF_2$ layer have more light scattering and have more spectral smoothing. Depending on the lateral size of the scattering centers, light scattering can also create a color effect (as is well known in Rayleigh or Mie scattering).

Example 2

To produce a coated article an ion-exchanged glass substrate (commercially available as Gorilla® glass from Corning Inc.) was provided with light-altering features on one of its surfaces by sandblasting followed by acid polishing to produce a 7% haze on the surface thereof. FIGS. 11A and 11B show micrographs of two different samples as measured over a 80 micron square window of the surface. The surface roughnesses, as measured by atomic force microscope (AFM), are shown in Table 4.

TABLE 4

Surface Properties of Substrate with Light-altering Features

| Sample | Ra (nm) | Rq (nm) | Haze |
|---|---|---|---|
| FIG. 11A | 200 | 242 | 7% |
| FIG. 11B | 115 | 156 | 7% |

An optical coating was then disposed onto the each of the surfaces having the light-altering features. The optical coating had a structure as set forth in Table 5.

TABLE 5

Structure of Optical Coating

| Coating/Layer | Periods, if applicable | Material | Refractive Index (at 550 nm) | Physical Thickness (nm) |
|---|---|---|---|---|
| Ambient medium | — | Air | 1 | |
| Optical coating | 1 | $SiO_2$ | 1.48114 | 104 |
| | | $AlO_xN_y$ | 2.00605 | 30.6 |
| | | $SiO_2$ | 1.48114 | 16.6 |
| Scratch-Resistant Layer | | $AlO_xN_y$ | 2.00605 | 2000 |
| | 1 | $SiO_2$ | 1.48114 | 8.9 |
| | | $AlO_xN_y$ | 2.00605 | 42.5 |
| | 2 | $SiO_2$ | 1.48114 | 30.1 |
| | | $AlO_xN_y$ | 2.00605 | 24.9 |
| | 3 | $SiO_2$ | 1.48114 | 52.4 |
| | | $AlO_xN_y$ | 2.00605 | 8 |
| — | — | Glass | 1.50542 | |
| Total coating thickness (nm) | | | | 2318 |

After the optical coating was disposed onto each of the substrate surfaces, the roughness of the samples was again measured, and the results are shown in Table 6. FIGS. 12A and 12B show the surface of the samples of FIGS. 11A and 11B, respectively, after disposition of the optical coating.

TABLE 6

Surface Properties of Substrate with Light-altering Features and Optical Coating

| Sample | Ra (nm) | Rq (nm) |
|---|---|---|
| FIG. 12A | 169 | 222 |
| FIG. 12B | 141 | 176 |

As can be seen from a comparison of the values in Tables 4 and 6, the light-altering features (in the form of surface roughness) as initially disposed on the substrate surface were still present even after disposing a relatively thick (on the order of microns) optical coating thereon. Thus, the relatively thick optical coating does not have a detrimental effect on the beneficial properties of the light-altering features. Instead, the relatively thick optical coating was found to provide additional beneficial properties to the samples, without detrimentally impacting the beneficial properties of the light-altering features. For example, the relatively thick optical coating was found to: provide higher maximum hardness and higher elastic modulus to the article; reduce the first-surface reflectance of the article; and increase the 2-surface total transmittance of the article.

Figure 13A:
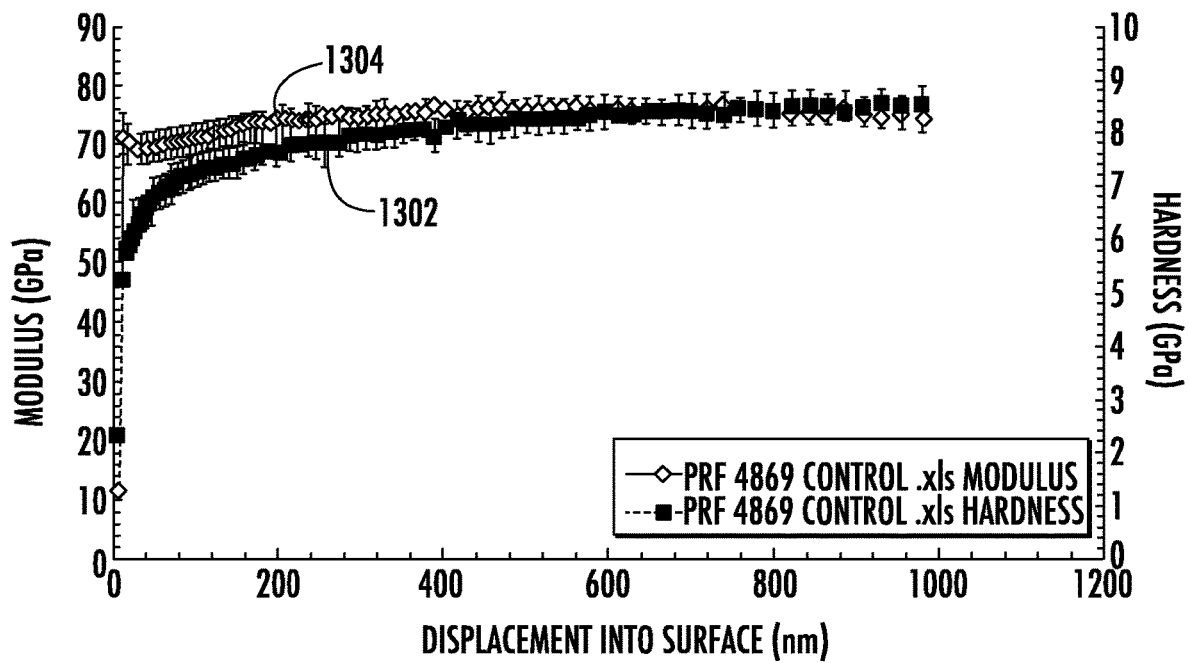
FIG. 13A is a plot of each Young's Modulus (in GPa on the left-hand y-axis) and hardness (in GPa on the right-hand y-axis) versus displacement into the Surface (in nm on the x-axis) for a substrate having light-altering features thereon.
Figure 13B:
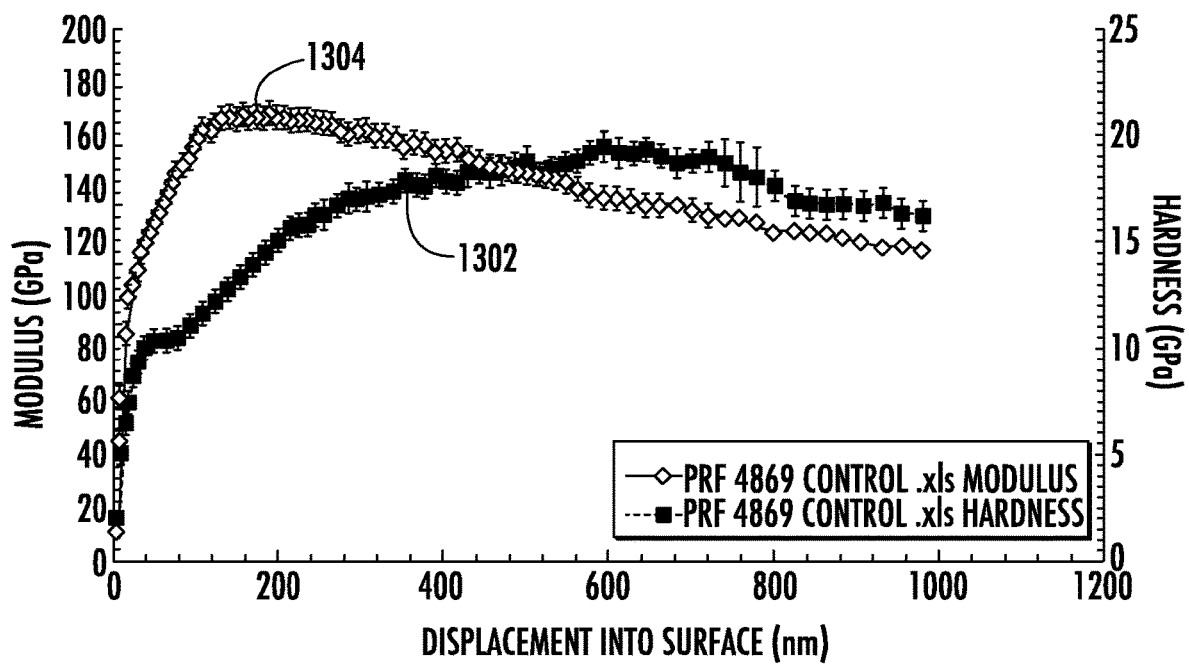
FIG. 13B is a plot of each Young's Modulus (in GPa on the left-hand y-axis) and hardness (in GPa on the right-hand y-axis) versus displacement into the Surface (in nm on the x-axis) for a substrate having light-altering features and an optical coating thereon, according to one or more embodiments described herein.

FIGS. 13A and 13B are graphs of hardness and elastic modulus (both as measured by the Berkovich Indenter Test described herein) for, respectively, a sample prepared as per the description of FIGS. 11A-B, and a sample prepared as per the description of FIGS. 12A-B. In the graphs of FIGS. 13A and 13B, line 1302 is representative of the samples of FIGS. 11A-B, and line 1304 is representative of the samples of FIGS. 12A-B. The elastic modulus and maximum hardness are shown in Table 7 below. As seen from FIGS. 13A-B and Table 7, the optical coating increases both the modulus and the maximum hardness of the article. The higher modulus and hardness lead to beneficial scratch resistance for the article. For example, the higher scratch resistance can provide a display device with a more robust cover that will be more aesthetically pleasing for a longer period of time, even after being dropped onto rough surfaces and/or abraded.

TABLE 7

Young's Modulus and Hardness of Various Substrates

| Sample | Young's Modulus (GPa) | Maximum Hardness (GPa) |
|---|---|---|
| FIGS. 11A-B | 76 | 8.4 |
| FIGS. 12A-B | 165 | 19 |

FIGS. 18A-B and 19A-B show how the optical coating of the samples in FIGS. 12A-B help reduce scratching upon abrasion events.

FIGS. 18A-B show the results of a Garnet Scratch Test (described above), wherein FIG. 18A is for a Gorilla® glass substrate having no light-altering features, and FIG. 18B is for a coated article consistent with the samples of FIGS. 12A-B. In each FIG. 18A-B there are three scratch tracks: the top-most scratch track (labeled 1 in FIGS. 18A-B) was a one-cycle test performed with at a rate of 25 cycles/minute and a load of 1 kilograms (kg); the middle scratch track (labeled 2 in FIGS. 18A-B) was a one-cycle test performed at a rate of 25 cycles/minute and with a load of 2 kg; and the bottom-most scratch track (labeled 4 in FIGS. 18A-B) was a one-cycle test performed at a rate of 25 cycles/minute and with a load of 4 kg. FIGS. 18A-B were obtained with a "ring light" disposed between the image capture device and the sample. From a comparison of FIG. 18A with FIG. 18B, it is seen that the samples corresponding to the preparation of FIGS. 12A-B had less visible scratches than the others and, thus, were more aesthetically pleasing.

FIGS. 19A-B show the results of a Taber Abrasion Test (described above), wherein FIG. 19A is for a Gorilla® glass substrate having no light-altering features, and FIG. 19B is for a coated article prepared in a manner consistent with that of the samples of FIGS. 12A-B. In each FIG. 19A-B, there are two scratch tracks. Each scratch track was the result of a ten-cycle test performed at a rate of 25 cycles/minute and with a load of 1350 kg, with a CS17 abradant (available from Taber Industries). FIGS. 19A-B were obtained with a "ring light" disposed between the image capture device and the sample. From a comparison of FIG. 19A with FIG. 19B, it is seen that the samples corresponding to the preparation of FIGS. 12A-B had less visible scratches than the others and, thus, were more aesthetically pleasing.

Figure 14:
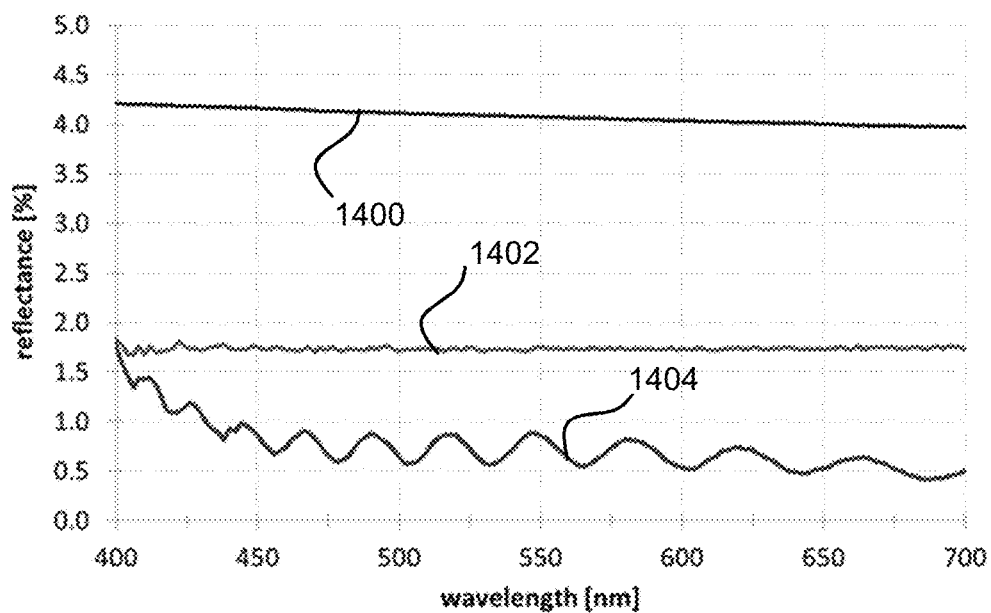
FIG. 14 is a plot of first-surface reflectance (in %) on the y-axis versus wavelength (in nm) on the x-axis for substrates, including those having light-altering features and optical coatings disposed thereon, according to one or more embodiments described herein.
Figure 15:
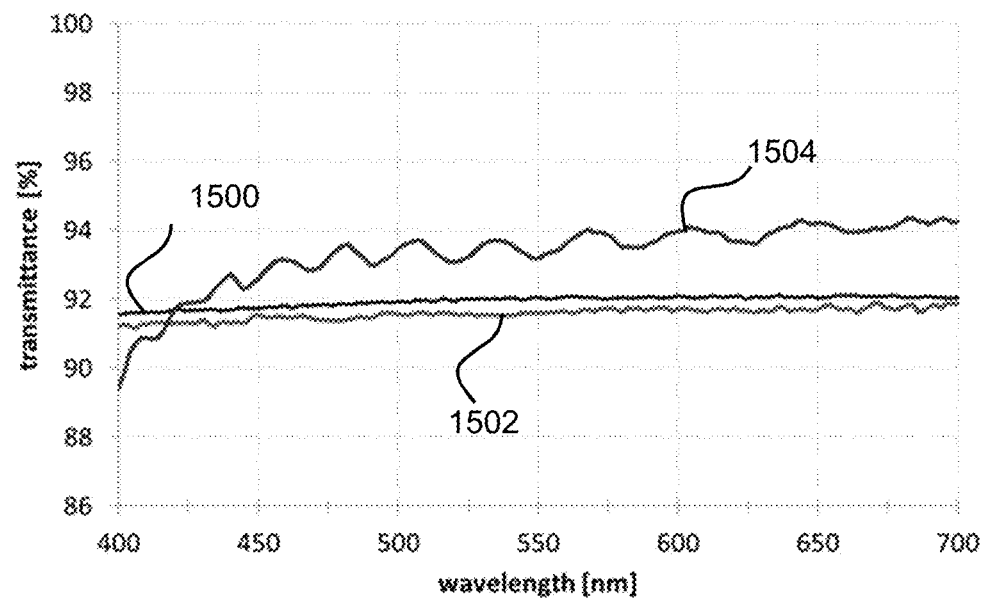
FIG. 15 is a plot of transmittance (in %) on the y-axis versus Wavelength (in nm) on the x-axis for substrates, including those having light-altering features and optical coatings disposed thereon, according to one or more embodiments described herein.

Additionally, the optical coating provides the article with a reduced specular first-surface reflectance, and an increased two-surface (or total) transmission. FIG. 14 shows the first surface reflectance for a substrate having no light-altering features (line 1400), a substrate according to FIGS. 11A-B having light-altering features (line 1402), and a substrate according to FIGS. 12A-B having light-altering features and an optical coating (line 1404). FIG. 15 shows the two-surface (or total) transmission for a substrate having no light-altering features (line 1500), a substrate according to FIGS. 11A-B having light-altering features (line 1502), and a substrate according to FIGS. 12A-B having light-altering features and an optical coating (line 1504). As can be seen from FIGS. 14 and 15, samples according to this embodiment were able to achieve a first-surface reflectance less than 1% over the optical wavelength regime, and also achieve a total transmission of greater than 92% over that same wavelength regime. A reduced specular reflectance, and increased transmission, provide a display device with better readability, particularly in high ambient light conditions.

Figure 16:
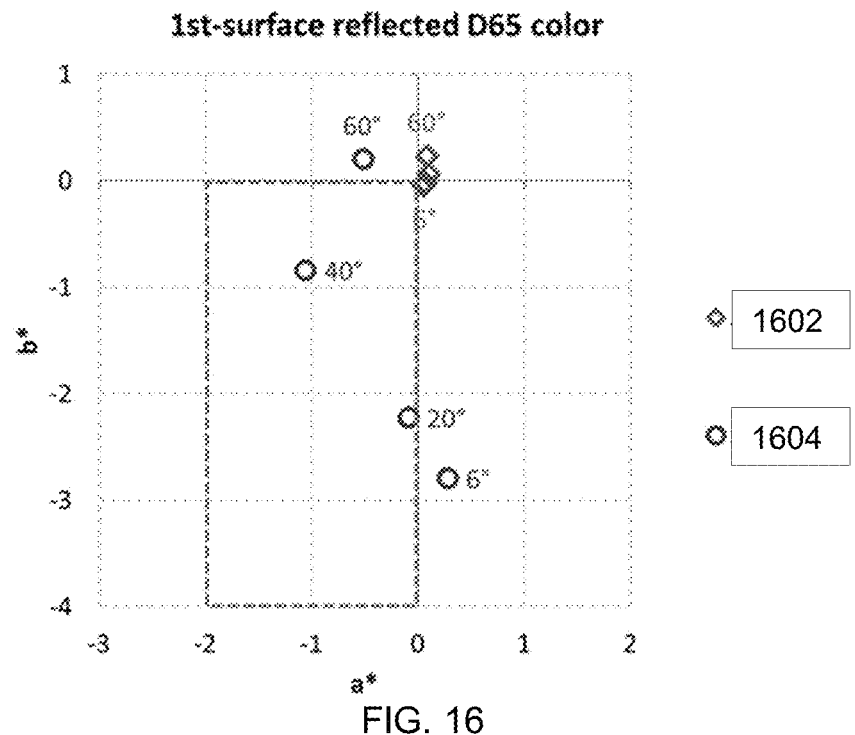
FIG. 16 is a plot of light color coordinates (r surface reflected color under D65 illumination for various viewing angles) for substrates, including those having light-altering features, as well as those having light-altering features and optical coatings disposed thereon according to one or more embodiments described herein.
Figure 17:
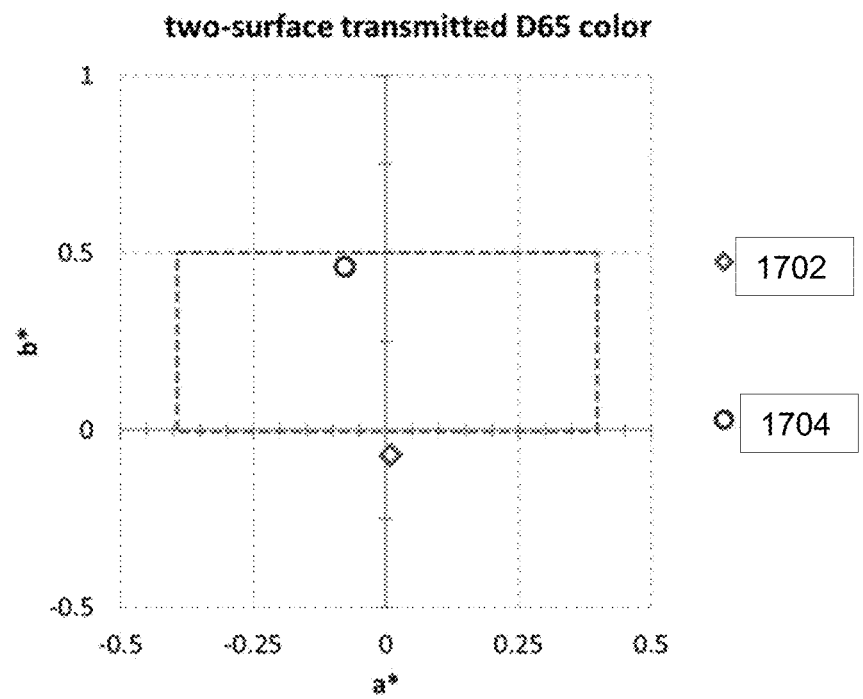
FIG. 17 is a plot of light color coordinates (two-surface transmitted color under D65 illumination at six degree angle of incidence) for substrates, including those having light-altering features, as well as those having light-altering features and optical coatings disposed thereon according to one or more embodiments described herein.

Further, the color of the coated article is driven mainly by the color of the optical coating itself. FIG. 16 shows first-surface reflected color, under D65 illuminant, for 6, 20, 40, and 60 degree angles of incidence, whereas FIG. 17 shows two-surface transmitted color at normal incidence for D65 illuminant. The diamond data points (1602, 1702) show the color for samples consistent with those of FIGS. 11A-B, whereas the circle data points (1604, 1704) show color for samples consistent with those of FIGS. 12A-B. As can be seen from FIGS. 16 and 17, the color of the article without coating (but having light-altering features, samples 11A-B) is very closely centered on a*, b* coordinates of (0, 0). Although the coated article (having light-altering features and optical coating, samples 12A-B) has increased color from the uncoated article (FIGS. 11A-B), the color is still very minimal, particularly in reflection at 40 and 60 degree angles of incidence, as well as in two-surface transmission. Thus, if a colored substrate were desirable, such could be achieved by altering the optical coating to do so.

Example 3

Example 3A

To produce a coated article an ion-exchanged glass substrate (commercially available as Gorilla® glass from Corning Inc.) was provided with light-altering features on one of its surfaces by sandblasting followed by acid polishing to produce a 4% haze on the surface thereof. An optical coating was then disposed onto the surface having the light-altering features. The optical coating had a structure as set forth in Table 8.

TABLE 8

Structure of Optical Coating

| Layer | Material | Refractive Index @550 nm | Physical Thickness (nm) |
|---|---|---|---|
| Medium | Air | 1 | |
| 1 | SiO2 | 1.4762 | 90.8 |
| 2 | Si3N4 | 2.0136 | 83.9 |
| 3 | SiO2 | 1.4762 | 29.8 |
| 4 | Si3N4 | 2.0136 | 39.9 |
| 5 | SiO2 | 1.4762 | 31.0 |
| 6 | SiOxNy | 1.9458 | 2000 |
| 7 | SiO2 | 1.4762 | 8.6 |
| 8 | SiOxNy | 1.9458 | 43.6 |
| 9 | SiO2 | 1.4762 | 29.4 |
| 10 | SiOxNy | 1.9458 | 25.5 |
| 11 | SiO2 | 1.4762 | 51.1 |
| 12 | SiOxNy | 1.9458 | 8.3 |
| Substrate | Gorilla ® Glass | 1.5063 | |
| Medium | Air | 1 | |

| | |
|---|---|
| Total coating thickness (all layers) | 2441.9 nm |
| Thickness (sum) of low-index material in coating | 240.7 nm |
| Fraction (%) of low-index matl. in coating | 9.9% |
| Thickness (sum) of low-index matl. above thickest hard layer in coating | 151.6 nm |
| Thickness (sum) of all layers above thickest hard layer in coating | 275.4 nm |
| Fraction (%) of low-index matl. above thickest hard layer in coating | 55.0% |

Example 3B

A coated article was prepared the same as in Example 3A, except that the light-altering features were formed so as to produce a 7% haze on the surface thereof.

Example 3C

A coated article was prepared the same as in Example 3A, except that the light-altering features were formed so as to produce a 27% haze on the surface thereof.

Example 3D

A coated article was prepared the same as in Example 3A, except that the light-altering features were formed so as to produce a 42% haze on the surface thereof.

Example 3E

A coated article was prepared the same as in Example 3A, except that the light-altering features were formed so as to produce a 50% haze on the surface thereof.

Example 3F

A coated article was prepared the same as in Example 3A, except that the light-altering features were formed so as to produce a 60% haze on the surface thereof.

Comparative Example 3G

A coated article was prepared the same as in Example 3A, except that the light-altering features were formed so as to produce a 7% haze on the surface thereof, and no optical coating was disposed over the light-altering features.

Comparative Example 3H

A coated article was prepared the same as in Example 3A, except that the light-altering features were formed so as to produce a 27% haze on the surface thereof, and no optical coating was disposed over the light-altering features.

Figure 20:
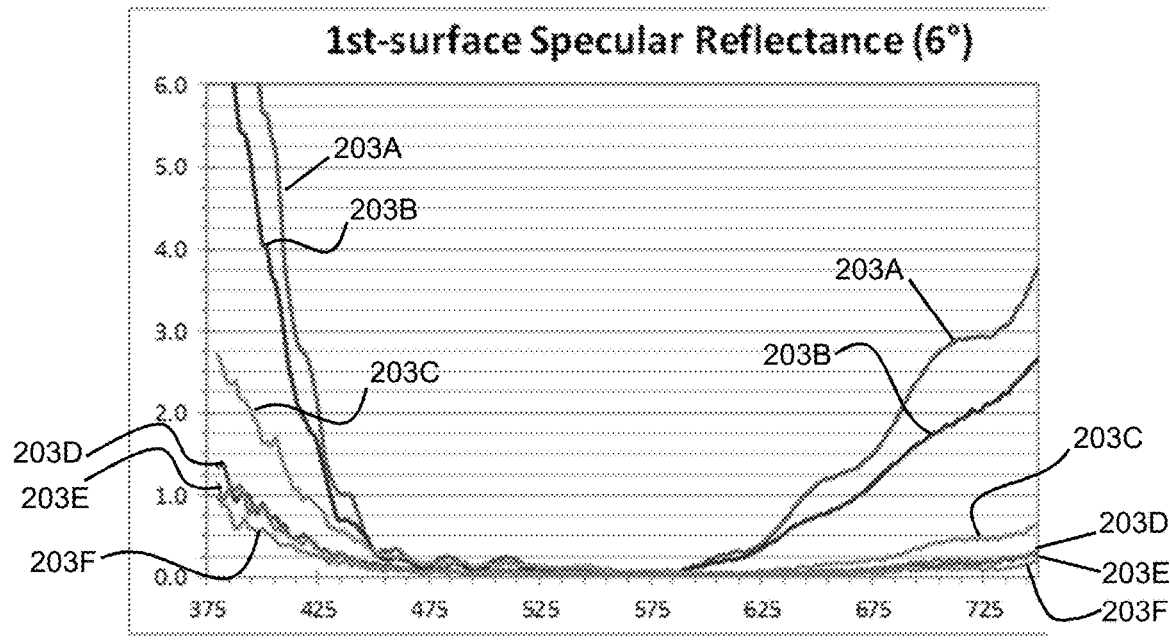
FIG. 20 is a plot of first-surface specular reflectance (in % on the y-axis, for a 6 degree angle of incidence) versus wavelength (in nm on the x-axis) for example articles having various AG (anti-glare) haze levels, according to one or more embodiments described herein.
Figure 21:
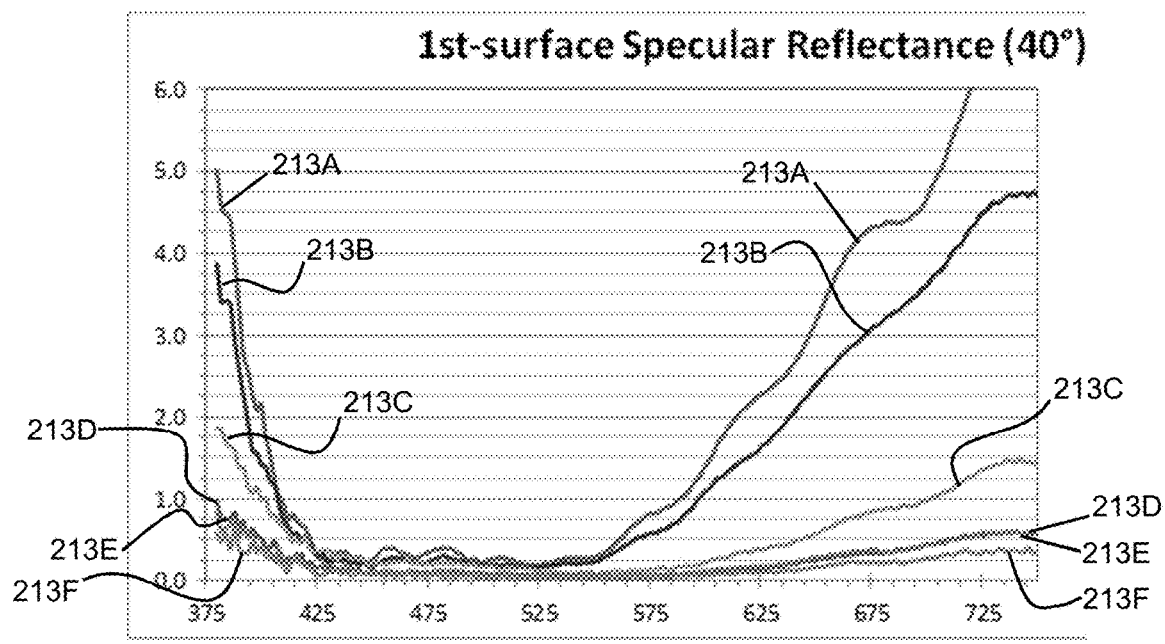
FIG. 21 is a plot of first-surface specular reflectance (in % on the y-axis, for a 40 degree angle of incidence) versus wavelength (in nm on the x-axis) for example articles having various AG haze levels, according to one or more embodiments described herein.
Figure 22:
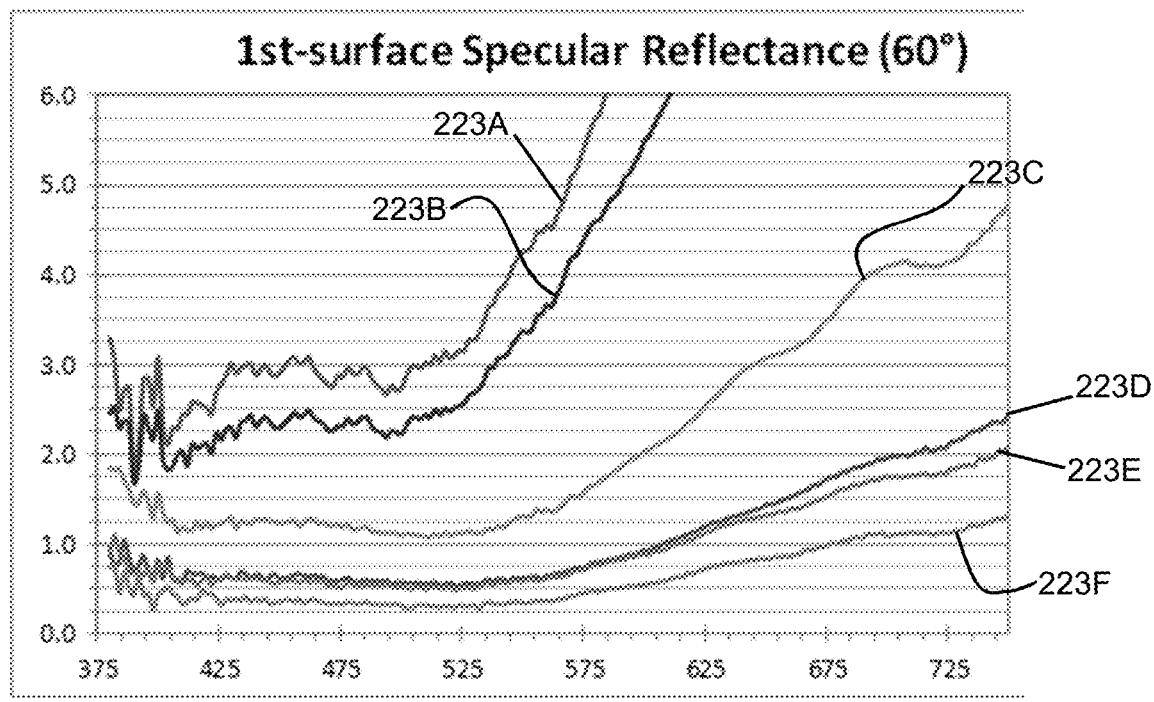
FIG. 22 is a plot of first-surface specular reflectance (in % on the y-axis, for a 60 degree angle of incidence) versus wavelength (in nm on the x-axis) for example articles having various AG haze levels, according to one or more embodiments described herein.

Examples 3A-3F achieved a low single-side specular reflectance at various angles of incidence. FIGS. 20-22 show first surface specular reflectance in percent along the y-axis versus wavelength in nm along the x-axis for Examples 3A-3F, wherein FIG. 20 is for a six degree incident angle, FIG. 21 is for a 40 degree incident angle, and FIG. 22 is for a 60 degree incident angle. In FIG. 20, line 203A is the reflectance of Example 3A, line 203B is the reflectance of Example 3B, line 203C is the reflectance of Example 3C, line 203D is the reflectance of Example 3D, line 203E is the reflectance of Example 3E, and line 203F is the reflectance of Example 3F. In FIG. 21, line 213A is the reflectance of Example 3A, line 213B is the reflectance of Example 3B, line 213C is the reflectance of Example 3C, line 213D is the reflectance of Example 3D, line 213E is the reflectance of Example 3E, and line 213F is the reflectance of Example 3F. In FIG. 22, line 223A is the reflectance of Example 3A, line 223B is the reflectance of Example 3B, line 223C is the reflectance of Example 3C, line 223D is the reflectance of Example 3D, line 223E is the reflectance of Example 3E, and line 223F is the reflectance of Example 3F. From FIGS. 20-22, it is seen that single-side (1$^{st}$ surface) specular reflectance for the inventive hardcoated textured samples can be below 0.5% or even below 0.25% for wavelengths from 450 nm to 550 nm, 600 nm, or 650 nm. These reflectance values can remain low, below 0.5%, from near-normal incidence angles up to 40 degrees angle of incidence (see FIGS. 20 and 21), and can remain below 3%, below 1.5%, or below 1% for some samples at 60 degrees angle of incidence (see FIG. 22, and Table 9 below).

TABLE 9

| Sample (haze %), Light Incident Angle | Photopic Average 1st-Surface Reflectance, % (Y, D65, CIE 1964, 10°obs.) |
|---|---|
| 4% Haze, 6° | 0.16 |
| 4% Haze, 20° | 0.19 |
| 4% Haze, 40° | 0.71 |
| 4% Haze, 60° | 4.68 |
| 7% Haze, 6° | 0.14 |
| 7% Haze, 20° | 0.16 |
| 7% Haze, 40° | 0.53 |
| 7% Haze, 60° | 3.77 |
| 27% Haze, 6° | 0.11 |
| 27% Haze, 20° | 0.10 |
| 27% Haze, 40° | 0.17 |
| 27% Haze, 60° | 1.49 |
| 42% Haze, 6° | 0.06 |
| 42% Haze, 20° | 0.05 |
| 42% Haze, 40° | 0.08 |
| 42% Haze, 60° | 0.72 |
| 50% Haze, 6° | 0.05 |
| 50% Haze, 20° | 0.04 |
| 50% Haze, 40° | 0.08 |
| 50% Haze, 60° | 0.67 |
| 60% Haze, 6° | 0.03 |
| 60% Haze, 20° | 0.03 |
| 60% Haze, 40° | 0.05 |
| 60% Haze, 60° | 0.41 |

Figure 23:
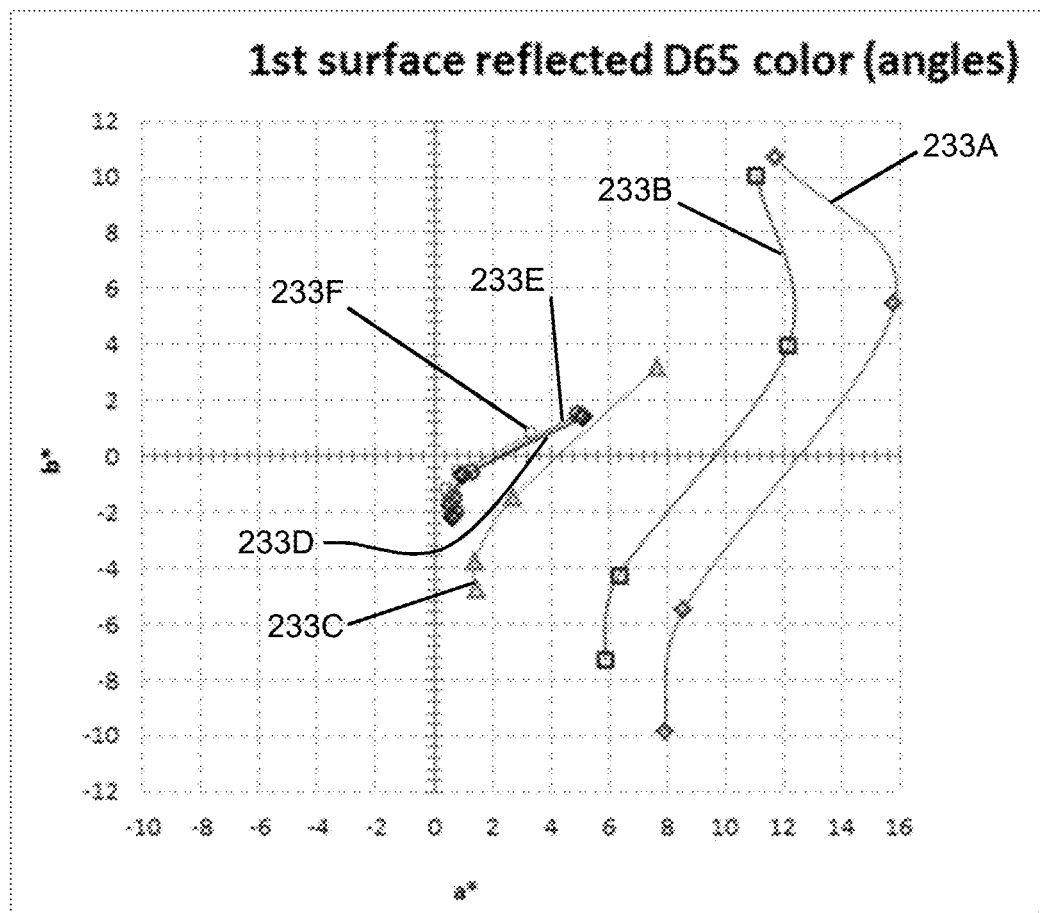
FIG. 23 is a plot of light color coordinates ($1^{st}$-surface reflected color under D65 illumination for various angles of incidence) for example articles having various AG haze levels, according to one or more embodiments described herein.

FIG. 23 shows the first-surface reflected color of Examples 3A-F under a D65 illuminant at 6, 20, 40, and 60 degree incident angles. In FIG. 23, line 233A is the reflected color of Example 3A, line 233B is the reflected color of Example 3B, line 233C is the reflected color of Example 3C, line 233D is the reflected color of Example 3D, line 233E is the reflected color of Example 3E, and line 233F is the reflected color of Example 3F. Higher haze on the underlying substrate prior to deposition of the optical coating, as in Examples 3C-E having respective haze values of 42%, 50% and 60%, resulted in more muted reflected color. Accordingly, in situations where low color is preferred, as in display applications for example, higher haze values on the underlying substrate can be used. Alternatively, in situations where high color is preferred, as in eyeglasses for example, lower haze values on the underlying substrate, as in Examples 3A and 3B having respective haze values of 4% and 7%, can be used. In either case, the a* and b* reflected color values can have an absolute value less than 16, less than 12, less than 10, less than 5, or even less than 2, as seen in FIG. 23 for example.

Examples 3A-F and Comparative Examples 3G and H were then tested for scratch and abrasion resistance using reflectance values as follows. Specifically, three reflectance values were studied, total reflectance (SCI), diffuse reflectance (SCE), and specular reflectance (SCI-SCE). SCI, SCE, and Specular Reflectance (SCI-SCE) were measured with a Konica-Minolta CM700D instrument according to the procedure as described above. For each Example 3A-F, and each Comparative Example 3G and H, as a reference point the reflectances were measured before any abrasion to the samples. A sample of each Example 3A-F was then abraded according to the Kovax Test (as described above) using a 1 kg load (total weight) and 50 cycles at a rate of 25 cycles/minute. Another sample of each Example 3A-F was then abraded according to the Garnet Test (as described above) using a 4 kg load (total load including weight of the spline, shaft, collet and the weight holder) and one cycle at a rate of 25 cycles/minute. The total reflectance SCI for each sample prior to abrasion, after Kovax abrasion, and after Garnet abrasion, as well as the diffuse reflectance SCE for each sample prior to abrasion, after Kovax abrasion, and after Garnet abrasion, as well as the specular reflectance (SCI-SCE) for each sample prior to abrasion, after Kovax abrasion, and after Garnet abrasion, are reported in Table 10 below.

TABLE 10

| Sample | Haze % of Light-altering Features | Before abrasion | After Kovax 1 kg, 50 cycles | After Garnet 4 kg, 1 cycle |
|---|---|---|---|---|
| Total reflectance, SCI (Diffuse + Specular) | | | | |
| Example 3A | 4 | 4.3 | 7.7 | 4.6 |
| Example 3B | 7 | 4.5 | 7.7 | 4.6 |
| Example 3C | 27 | 4.7 | 6.3 | 4.9 |
| Example 3D | 42 | 5.2 | 7.2 | 5.3 |
| Example 3E | 50 | 4.9 | 7.5 | 4.8 |
| Example 3F | 60 | 5.0 | 7.7 | 5.0 |
| Comp. Ex. 3G | 7 | 7.7 | | |
| Comp. Ex. 3H | 27 | 7.5 | | |
| Diffuse reflectance, SCE | | | | |
| Example 3A | 4 | 0.09 | 0.7 | 0.1 |
| Example 3B | 7 | 0.17 | 0.7 | 0.1 |
| Example 3C | 27 | 0.71 | 1.1 | 0.8 |
| Example 3D | 42 | 1.75 | 2.2 | 1.9 |
| Example 3E | 50 | 1.58 | 2.6 | 1.7 |
| Example 3F | 60 | 2.28 | 4.5 | 2.4 |
| Comp. Ex. 3G | 7 | 0.48 | | |
| Comp. Ex. 3H | 27 | 2.01 | | |
| Specular reflectance, (SCI-SCE) | | | | |
| Example 3A | 4 | 4.2 | 7.0 | 4.5 |
| Example 3B | 7 | 4.3 | 7.0 | 4.5 |
| Example 3C | 27 | 4.0 | 5.2 | 4.0 |
| Example 3D | 42 | 3.4 | 4.9 | 3.4 |
| Example 3E | 50 | 3.3 | 4.8 | 3.2 |
| Example 3F | 60 | 2.7 | 3.1 | 2.6 |
| Comp. Ex. 3G | 7 | 7.2 | | |
| Comp. Ex. 3H | 27 | 5.5 | | |

The Garnet test, with a single scratch cycle, is believed to be more relevant to real-world scratching because the majority of real-world scratches are single-cycle events. The Kovax test, at 50 cycles, is more of an abrasive wear test that is less relevant to real-world scratching in applications such as smartphones, touch screens, smart watches, and auto displays, but the Kovax test may provide a somewhat higher level of repeatability due to the high number of cycles and resulting high density of scratches, which results in a more optically uniform scratched/abraded area.

Values in Table 10 represent D65, photopic averages for SCE and SCI, using an average of 3 measurement spots on each of 3 sample replicates, with one scratch track on each sample for the Garnet Scratch Test and two scratch tracks on each sample for the Kovax test. The range of values for each averaged data point was generally on the order of +/−0.5 or less for SCI, and +/−0.1 or less for SCE.

The SCE and SCI values in Table 10 include approximately 4% reflectance from the rear, untreated surface of the glass samples. The front-surface reflectance of the samples can be approximated, at least for the low-scattering samples, by subtracting 4% from the SCE and SCI values shown. When a measurement is denoted as a '2-sided' measurement, the back surface of the sample has a reflectance that is included in the measurement, and not removed through optical coupling to an absorber (if the back surface reflectance is removed, this is denoted as a '1-sided' or 'first-surface' measurement).

Example 4

Examples 4A to 4L

To produce coated articles ion-exchanged glass substrates (commercially available as Gorilla® glass from Corning Inc.) were provided with light-altering features on one of their surfaces by sandblasting followed by acid polishing to produce various haze levels on that surface. An optical coating was then disposed onto the surface having the light-altering features. The optical coating had a structure as set forth in Table 8 above. Examples 4A to 4L were produced with the haze levels set forth in Table 11 below.

Comparative Examples 4M to 4S

Comparative Examples 4M to 4S were produced in the same manner as Examples 4A to 4L, except that no optical coating was disposed on these comparative examples. Comparative Examples 4M to 4S had the haze levels set forth in Table 11 below.

TABLE 11

| Haze Level (%) | Example | Comparative Example |
|---|---|---|
| 3 | 4A | |
| 3 | 4B | 4M |
| 4 | | 4N |
| 6 | 4C | 4O |
| 6 | 4D | |
| 23 | 4E | |
| 23.5 | | 4P |
| 24 | 4F | |
| 41 | 4G | 4Q |
| 42 | 4H | |
| 46 | | 4R |
| 49 | 4I | |
| 53 | 4J | |
| 60 | 4K | |
| 61 | | 4S |
| 62 | 4L | |

Examples 4A to 4L were then studied for their performance under various anti-glare and optical-display-cover-glass metrics as follows. Gloss (at 60 degrees, measured as described above), Distinctness of Image (DOI) as measured at 20 degrees incidence, as described above, and Pixel Power Deviation (PPD) measured as described above, were studied. PPD correlates to visual appearance of grain or sparkle on a pixelated display covered with a surface having light-altering features.

Figure 24:
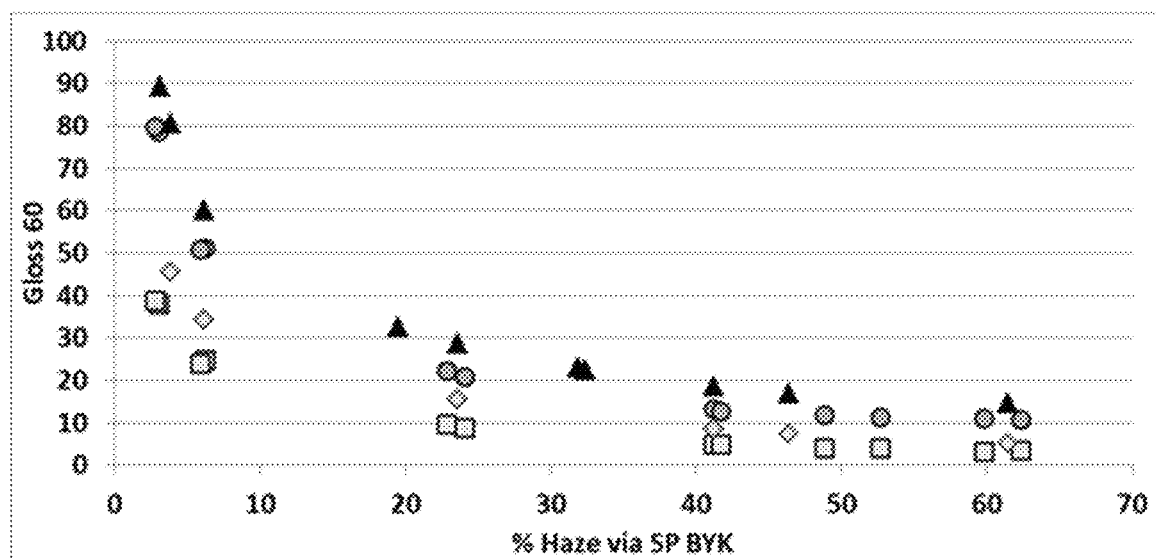
FIG. 24 is a plot of Gloss (measured at 60 degrees, in units along the y-axis) versus haze (in %, along the x-axis) for substrates, including those having light-altering features, as well as those having light-altering features and optical coatings disposed thereon according to one or more embodiments described herein.

FIG. 24 is a plot of Gloss (measured at 60 degrees) on the y-axis versus % haze on the x-axis. FIG. 24 includes: triangular data points corresponding to Comparative Examples 4M-S taken as a 2-sided measurement; circular data points corresponding to Examples 4A-L taken as a 2-sided measurement; diamond data points corresponding to Comparative Examples 4M-S taken as a 1-sided measurement; and square data points corresponding to Examples 4A-L taken as a 1-sided measurement. To make the 1-sided measurements, the back surface of the sample being measured was coupled to a light absorber to remove back surface reflection, whereas the 2-sided measurements included no such coupled light absorber.

Figure 25:
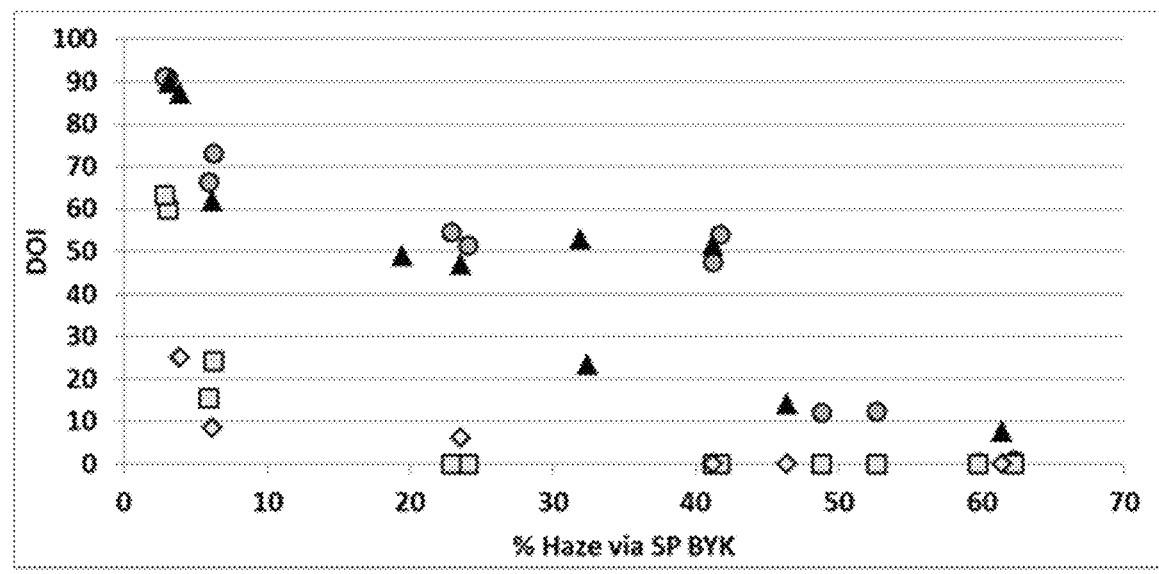
FIG. 25 is a plot of Distinctness of Image (DOI) (measured at 20 degrees incidence, in units along the y-axis) versus haze (in %, along the x-axis) for substrates, including those having light-altering features, as well as those having light-altering features and optical coatings disposed thereon according to one or more embodiments described herein.

FIG. 25 is a plot of DOI (measured at 20 degrees) on the y-axis versus % haze on the x-axis. FIG. 25 includes: triangular data points corresponding to Comparative Examples 4M-S taken as a 2-sided measurement; circular data points corresponding to Examples 4A-L taken as a 2-sided measurement; diamond data points corresponding to Comparative Examples 4M-S taken as a 1-sided measurement; and square data points corresponding to Examples 4A-L taken as a 1-sided measurement. To make the 1-sided measurements, the back surface of the sample being measured was coupled to a light absorber to remove back surface reflection, whereas the 2-sided measurements included no such coupled light absorber.

Figure 26:
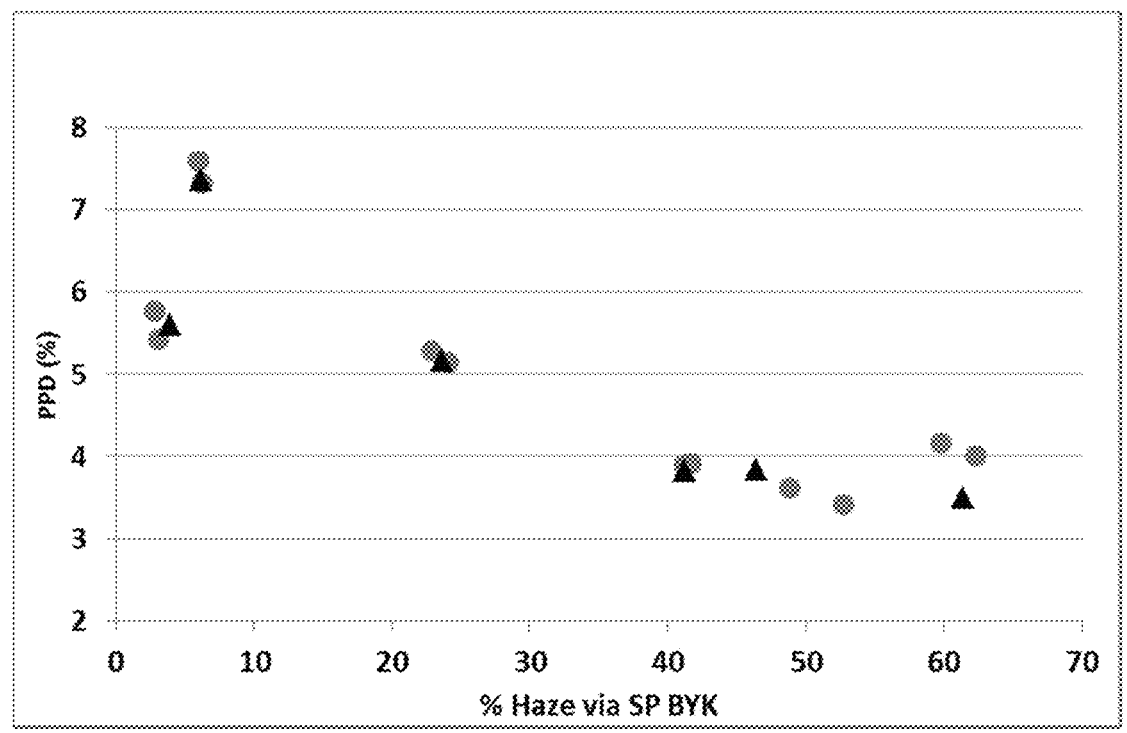
FIG. 26 is a plot of Pixel Power Deviation (PPD) (in % along the y-axis) versus haze (in %, along the x-axis) for substrates, including those having light-altering features, as well as those having light-altering features and optical coatings disposed thereon according to one or more embodiments described herein.

FIG. 26 is a plot of PPD (measured with an underlying display having 140 pixels per inch) on the y-axis versus % haze on the x-axis. FIG. 26 includes: triangular data points corresponding to Comparative Examples 4M-S; and circular data points corresponding to Examples 4A-L.

FIGS. 24-26 respectively show that Gloss, DOI, and PPD are maintained, slightly improved, or not substantially degraded by the addition of an optical scratch-resistant coating onto a substrate surface having textured light-altering (or anti-glare) features, when compared to the samples without optical coatings.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom, inward, outward—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A coated article comprising:
   a transparent substrate having a major surface, the major surface comprising a rough surface inducing light scattering; and
   an optical coating disposed on the major surface of the transparent substrate and forming an air-side surface, the optical coating comprising one or more layers of material, the optical coating having a physical thickness of greater than 200 nm;
   wherein the coated article exhibits a maximum hardness of about 10 GPa or greater as measured on the air-side surface by a Berkovich Indenter Hardness Test along an indentation depth of about 50 nm or greater,
   wherein the major surface comprises a roughness of at least one of: (i) Rq of 100 nm or greater, and (ii) Ra of 100 nm or greater, and
   further wherein the air-side surface comprises a roughness of at least one of: (i) Rq of 100 nm or greater, and (ii) Ra of 100 nm or greater.

2. The coated article of claim 1, wherein the optical coating has a physical thickness that is greater than the Ra or Rq of the rough surface.

3. The coated article of claim 1, wherein the optical coating has a physical thickness of greater than 250 nm.

4. The coated article of claim 1, further comprising a 2-sided specular reflectance (SCI-SCE) of at least one of: less than 4.5%; or less than 4%.

5. The coated article of claim 1, further comprising a 1-sided specular reflectance of at least one of: less than about 0.5%; or less than about 0.25%; or less than 0.2%; or less than 0.15%; or less than 0.1%; or less as photopic averages.

6. The coated article of claim 1, further comprising a 1-sided specular reflectance of at least one of: less than about 0.5%, from near-normal incidence angles up to 40 degrees angle of incidence; and below 3%, or below 1.5%, or below 1%, at 60 degrees angle of incidence.

7. The coated article of claim 1, further comprising a 2-sided diffuse reflectance (SCE) of greater than about 0.05 or greater than 0.1, and less than or equal to about 0.5, or about 1.0, or about 1.5, or about 2.0, or about 3.0.

8. The coated article of claim 1, further comprising a 2-sided total reflectance (SCI) less than about 5.5.

9. The coated article of claim 1, further comprising an a* and b* reflected color values having an absolute value less than 16, less than 12, less than 10, less than 5, or less than 2.

10. The coated article of claim 1, further comprising:
    an a* and/or b* having absolute value of at least one of: greater than about 6; from about 10 to about 16; greater than about 16; from about 10 to about 20; about 10 to about 30; about 10 to about 40; and about 10 to about 50; and
    a transmitted haze value on the major surface of at least one of: about 4% to about 7%; and less than 10%.

11. The coated article of claim 1, further comprising:
    an a* and/or b* having absolute value of at least one of: less than 6; less than 5; less than 4; and less than 2; and
    a transmitted haze value of the major surface of at least one of: greater than 10%; greater than 20%; greater than 25%; greater than 27%; greater than 40%; greater than 50%; and greater than 60%).

12. The coated article of claim 1, further comprising a 20 degree DOI of at least one of: less than 95; less than 90; less than 80; or less than 70.

13. The coated article of claim 1, further comprising a 60-degree Gloss value less than 80, or less than 60.

14. The coated article of claim 1, further comprising a total light transmittance of at least one of: higher than 80%, higher than 90%, higher than 94%.

15. The coated article of claim 1, further comprising a sparkle performance as measured by Pixel Power Deviation (PPD) of at least one of: less than 10%; or less than 5%.

16. The coated article of claim 1, wherein after a 150 grit Garnet Scratch Test under 4 kg load for one cycle at a rate of 25 cycles/minute, the article comprises at least one of:
- a 2-sided specular reflectance (SCI-SCE) of: less than 6.0% or less than 5.0%; and/or having changed from an unabraded value by less than 2.0%, less than 1.0%, or less than 0.5%;
- a 2-sided diffuse reflectance (SCE) of: less than 3.0%, less than 2.0%, less than 1.0%, or less than 0.5%; and/or having changed from the unabraded value by less than 1.0%, less than 0.5%, or less than 0.2%; and
- a 2-sided total reflectance (SCI) less than 6.0% or less than 5.0%, having changed from the unabraded value by less than 2.0%, less than 1.0%, less than 0.5%, or less than 0.2%.

17. The coated article of claim 1, wherein after a Taber Abrasion Test with 400 grit Kovax abrasive paper, under a load of 1 kg total weight, for 50 cycles at a rate of 25 cycles/minute, the article comprises at least one of:
- a 2-sided specular reflectance (SCI-SCE) of: less than 7.5%, less than 6.0%, or less than 5.0%; and/or having changed from the unabraded value by less than 3.0%, less than 2.0%, or less than 1.0%;
- a 2-sided diffuse reflectance (SCE) of: less than 5.0%, less than 3.0%, less than 2.0%, or less than 1.0%; and/or having changed from the unabraded value by less than 3.0%, less than 2.0%, less than 1.0%, or less than 0.5%; and/or
- a 2-sided total reflectance (SCI) of: less than 8.0%; and/or having changed from the unabraded value by less than 3.0%, less than 2.0%, less than 1.0%, or less than 0.5%.

18. The coated article of claim 1, further comprising a hardness of at least one of: 12 GPa or greater; 14 GPa or greater; 16 GPa or greater.

19. The coated article of claim 1, further comprising a hardness of at least 12 GPa or greater and an optical coating thickness of greater than 300 nm.

20. The coated article of claim 1, further comprising a hardness of at least 14 GPa or greater and an optical coating thickness of at least 500 nm.

21. The coated article of claim 1, wherein the article transmittance and/or reflectance color coordinates in the L*a*b* colorimetry system at normal incidence under an International Commission on Illumination illuminant exhibits a reference point color shift of less than about 10 from a reference point as measured at the air-side surface, the reference point comprising the color coordinates ($a^*=0$, $b^*=0$), ($a^*=-2$, $b^*=-2$), or the respective transmittance or reflectance color coordinates of the substrate, wherein:

when the reference point is the color coordinates ($a^*=0$, $b^*=0$), the color shift is defined by $\sqrt{((a^*_{article})^2+(b^*_{article})^2)}$;

when the reference point is the color coordinates ($a^*=-2$, $b^*=-2$), the color shift is defined by $\sqrt{(a^*_{article}+2)^2+(b^*_{article}+2)^2)}$; and when the reference point is the color coordinates of the substrate, the color shift is defined by $\sqrt{((a^*_{article}-a^*_{substrate})^2+(b^*_{article}-b^*_{substrate})^2)}$.

22. The coated article of claim 1, wherein the coated article has an average photopic transmittance of about 50% or greater.

23. An electronic device comprising the coated article of claim 1.

24. The coated article of claim 1, wherein the rough surface of the major surface of the substrate includes light-altering sandblasted features.

25. The coated article of claim 24, wherein the coated article exhibits a transmitted haze from about 4% to about 60% and a 1-sided specular reflectance of less than about 0.5% from 450 nm to 650 nm at incident angles from 6° to 40°.

26. The coated article of claim 25, wherein the optical coating further comprises a plurality of alternating high and low refractive index layers, and further wherein each high index layer comprises a nitride or an oxynitride and each low index layer comprises an oxide.

* * * * *

UNITED STATES PATENT AND TRADEMARK OFFICE
CERTIFICATE OF CORRECTION

PATENT NO. : 10,921,492 B2
APPLICATION NO. : 16/243568
DATED : February 16, 2021
INVENTOR(S) : Joan Deanna Gregorski et al.

It is certified that error appears in the above-identified patent and that said Letters Patent is hereby corrected as shown below:

In the Claims

In Column 48, Line 62, Claim 11, delete "60%)." and insert -- 60%. --, therefor.

In Column 48, Line 67, Claim 13, delete "60-degree" and insert -- 60 degree --, therefor.

In Column 50, Line 18, Claim 21, delete "(a*"" and insert -- ((a* --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*